United States Patent
Wu et al.

(10) Patent No.: US 11,904,241 B2
(45) Date of Patent: Feb. 20, 2024

(54) VIRTUAL ITEM CONTROL METHOD AND APPARATUS, TERMINAL, AND STORAGE MEDIUM

(71) Applicant: Tencent Technology (Shenzhen) Company Limited, Guangdong (CN)

(72) Inventors: Shengyu Wu, Shenzhen (CN); Cong Tian, Shenzhen (CN); Meng Qiu, Shenzhen (CN); Jingjing He, Shenzhen (CN); Dancheng Zou, Shenzhen (CN); Boyi Liu, Shenzhen (CN); Weijian Cui, Shenzhen (CN); Yi Li, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 265 days.

(21) Appl. No.: 17/535,014

(22) Filed: Nov. 24, 2021

(65) Prior Publication Data
US 2022/0080313 A1    Mar. 17, 2022

Related U.S. Application Data

(63) Continuation of application No. PCT/CN2021/114392, filed on Aug. 24, 2021.

(30) Foreign Application Priority Data

Sep. 4, 2020   (CN) .......................... 202010923419.X

(51) Int. Cl.
 A63F 13/533   (2014.01)
 A63F 13/52    (2014.01)
(Continued)

(52) U.S. Cl.
 CPC ............ *A63F 13/533* (2014.09); *A63F 13/52* (2014.09); *A63F 13/573* (2014.09);
(Continued)

(58) Field of Classification Search
None
See application file for complete search history.

(56) References Cited

U.S. PATENT DOCUMENTS 8,951,128 B1    2/2015 Farley et al.
10,213,679 B1 *  2/2019 Carter ................... A63F 9/0291
(Continued)

FOREIGN PATENT DOCUMENTS

CN   105597315 A   5/2016
CN   108434736 A   8/2018
(Continued)

OTHER PUBLICATIONS

Examination Report for corresponding Canadian application No. 3,133,922 dated Dec. 21, 2022, 5p.
(Continued)

*Primary Examiner* — Jason T Yen
(74) *Attorney, Agent, or Firm* — Crowell & Moring LLP

(57) ABSTRACT

Embodiments of this disclosure disclose a virtual item control method and apparatus, a terminal, and a non-transitory storage medium, and belong to the field of computer technologies. The method includes: displaying a plurality of item icons after a press operation on a throw button is detected; controlling, in response to the press operation moving to the target item icon and a duration reaches a target duration, a virtual object to hold a target virtual item corresponding to the target item icon; controlling, in response to a movement of the press operation, the virtual object to aim at a target position; and controlling, in response
(Continued)

to a release of the press operation, the virtual object to throw the target virtual item to the target position.

13 Claims, 11 Drawing Sheets

(51) Int. Cl.
    *A63F 13/573*     (2014.01)
    *A63F 13/837*     (2014.01)
    *G06F 3/04817*     (2022.01)
    *G06F 3/0484*     (2022.01)
    *G06F 3/0488*     (2022.01)

(52) U.S. Cl.
    CPC .......... *A63F 13/837* (2014.09); *G06F 3/0484* (2013.01); *G06F 3/0488* (2013.01); *G06F 3/04817* (2013.01); *A63F 2300/308* (2013.01); *A63F 2300/646* (2013.01); *A63F 2300/8076* (2013.01)

(56) References Cited

U.S. PATENT DOCUMENTS

| | | |
|---|---|---|
| 2005/0197178 A1 | 9/2005 | Villegas |
| 2012/0192108 A1 | 7/2012 | Kolb |
| 2013/0132904 A1 | 5/2013 | Primiani et al. |
| 2016/0171835 A1 | 6/2016 | Washington et al. |
| 2017/0140209 A1 | 5/2017 | Chen et al. |
| 2018/0015375 A1* | 1/2018 | Marino ................. A63F 13/537 |
| 2020/0306633 A1 | 10/2020 | Guo et al. |
| 2020/0368622 A1* | 11/2020 | Kando ................. G06F 1/1669 |
| 2021/0113924 A1 | 4/2021 | Liu |
| 2021/0146248 A1* | 5/2021 | Chen ..................... A63F 13/837 |
| 2022/0126205 A1 | 4/2022 | Wan et al. |

FOREIGN PATENT DOCUMENTS

| | | |
|---|---|---|
| CN | 108579089 A | 9/2018 |
| CN | 109200582 A | 1/2019 |
| CN | 110427111 A | 11/2019 |
| CN | 110538459 A | 12/2019 |
| CN | 110585706 A | 12/2019 |
| CN | 110585712 A | 12/2019 |
| CN | 110585731 A | 12/2019 |
| CN | 110893277 A | 3/2020 |
| CN | 111124133 A | 5/2020 |
| CN | 111249731 A | 6/2020 |
| CN | 111282275 A | 6/2020 |
| CN | 111298441 A | 6/2020 |
| CN | 111330268 A | 6/2020 |
| CN | 111330274 A | 6/2020 |
| CN | 111475573 A | 7/2020 |
| CN | 111589127 A | 8/2020 |
| CN | 111589145 A | 8/2020 |
| CN | 112044071 A | 12/2020 |
| EP | 2 818 215 A2 | 12/2014 |
| EP | 2 818 215 A3 | 12/2014 |
| JP | 2008-061912 A | 3/2008 |
| RU | 2 652 428 C2 | 4/2018 |
| WO | WO 2008/032565 A1 | 3/2008 |
| WO | WO 2021/147496 A1 | 7/2021 |
| WO | WO 2021/203856 A1 | 10/2021 |

OTHER PUBLICATIONS

Search Report and Written Opinion for corresponding Singapore application No. 11202111498T dated Feb. 17, 2023, 11p.

Exmination Report No. 1 for corresponding application No. AU 2021250927 dated Oct. 7, 2022, 3p.
Xiaomo, "Want to say is to hold down the skill button and then move the steering wheel drag the skill dorection", Oct. 11, 2018, URL: www.taptap.com/video/1009192(https://web.archive.org/web/20221030215212/https://www.taptap.cn/video/1009192). Please see the Examination Report's comment for the Relevancy.
Notice of Reasons for Refusal for corresponding Japanese application No. 2021-563700 dated Aug. 12, 2022, 5p, in Japanese language.
English langauge translation for Notice of Reasons for Refusal for corresponding Japanese application No. 2021-563700 dated Aug. 12, 2022, 5p.
Examination Report No. 2 for corresponding Australian application No. 2021250927 dated Mar. 22, 2023, 3p.
Substantive Examination Report for corresponding for Saudi application No. 521430607 dated Jan. 16, 2023, 7p, in Saudi language.
Concise Explanation of Relevancy for F4.
English language translation for Request for the Submission of an Opinion for corresponding Korean application No. 10-2021-7033784 dated Aug. 16, 2023, 22p.
Request for the Submission of an Opinion for corresponding Korean application No. 10-2021-7033784 dated Aug. 16, 2023, 17p, Korean laguage.
Author unknown, "[Mobile PUBG] Collection of Mobae grnades! I'll blow it all up~~ feat. Molotov cocktail. A video that makes you feel relieved." dated Sep. 5, 2019, found at https://www.youtube.com/watch?v=o4NxmbPJqzA; see also https://web.archive.org/web/20230914212240/https://www.youtube.com/watch?v=o4NxmbPjqzA; 5p in total.
Clark, Josh, "Touch Means a New Chance for Radial Menus", dated Jul. 17, 2012, internet posted writing found at https://bigmedium.com./ideas/radial-menus-for-touch-ui-html.
Extended European Search Report for application No. EP 21783117.1 dated Aug. 12, 2022, 10p.
Communication pursuant to Rules 70(2) and 70a(2) EPC regarding Supplementary European Search Report for application No. EP 21783117.1 dated Aug. 30, 2022, 1p.
Clark, Josh, "Touch Means a New Chance for Radial Menus", *Big Medium*, Jul. 17, 2012, 10p, US.
Kurtenbach, Gordon et al., "User Learning and Performance with Marking Menus", *Huamn Factors in Computing Systems*, Proceedings of the SIGCHI Conference on Human Factors in Computing Celebrating Interdependence, Apr. 24, 1994, pp. 258-264, CA.
International Search Report and Written Opinion for priority application PCT/CN2021/114932 dated Nov. 23, 2021, 11p, in Chinese language.
Concise Explanation of Relevance for A16.
Russian Search Report for application No. RU 2021129329/28(062232) dated Aug. 24, 2021, 2p, in Russian language.
English language translation of Russian Search Report for application No. RU 2021129329/28(062232) dated Aug. 24, 2021, 2p.
Russian Office Action for application No. RU 2021129329/28(062232) dated Jul. 25, 2022, 11p. in Russian language.
English language translation of Russian Office Action for priority application No. RU 2021129329/28(062232) dated Jul. 25, 2022, 10p.
"Godlike Aim in PUBG Mobile! Full Settings Walkthrough!", found on the internet Wayback Machine (Youtube) @ https://web.archive.org/web/20180410095435/https://www.youtube.com/watch?v=F2N674y4Fa4&gl=US&hl=en, published in 2018.
Author/Title unknown; YouTube video found on the internet @ https://www.youtube.com/watch?v=hvtkGTXpJ5w, dated Dec. 7, 2019, 6p, in Japanese language, English Translation of subtitles available at https://www.youtube.com/watch?v=hvtkGTXpJ5w.

* cited by examiner

VIRTUAL ITEM CONTROL METHOD AND APPARATUS, TERMINAL, AND STORAGE MEDIUM

RELATED APPLICATION

This application is a continuation of International Patent Application No. PCT/CN2021/114392, filed Aug. 24, 2021, which claims priority to Chinese Patent Application No. 202010923419.X, entitled "VIRTUAL ITEM CONTROL METHOD AND APPARATUS, TERMINAL, AND STORAGE MEDIUM" filed on Sep. 4, 2020. The above applications are incorporated herein by reference in their entireties.

TECHNICAL FIELD

Embodiments of this application relate to the field of computer technologies, and in particular, to a virtual item control method and apparatus, a terminal, and a storage medium.

BACKGROUND

With rapid development of computer technologies and popularization of smart terminals, electronic games have been widely used. In a virtual scene provided by the electronic game, a user may control a virtual object to throw a virtual item such as a grenade, a smoke grenade, or a shock bomb.

SUMMARY

Embodiments of this disclosure provide a virtual item control method and apparatus, a terminal, and a storage medium, to improve the throwing efficiency. The technical solutions are as follows:

In an aspect, a virtual item control method is provided, performed by a terminal, the method including:
displaying a plurality of item icons after a press operation on a throw button is detected, the plurality of item icons including a target item icon;
displaying a plurality of item icons after a press operation on a throw button is detected, the plurality of item icons comprising a target item icon;
controlling, in response to the press operation moving to the target item icon and a duration reaches a target duration, a virtual object to hold a target virtual item corresponding to the target item icon, the duration being defined by the period of the press operation on the target item icon;
controlling, in response to a movement of the press operation, the virtual object to aim at a target position; and
controlling, in response to a release of the press operation, the virtual object to release the target virtual item toward the target position.

In another aspect, a virtual item control method is provided, performed by a terminal, the method including:
displaying a target item icon in a throw button;
controlling, in response to a duration of a press operation on the target item icon reaching a target duration, a virtual object to hold a target virtual item corresponding to the target item icon;
controlling, in response to a movement of the press operation, the virtual object to aim at a target position; and
controlling, in response to a release of the press operation, the virtual object to throw the target virtual item to the target position.

In another aspect, a virtual item control apparatus is provided, including:
an icon display module, configured to display a plurality of item icons after a press operation on a throw button is detected, the plurality of item icons including a target item icon;
an object control module, configured to control, in a case that the press operation moves to the target item icon and a duration reaches a target duration, a virtual object to hold a target virtual item corresponding to the target item icon, the duration being a duration of the press operation on the target item icon;
an aiming control module, configured to control, in response to a movement of the press operation, the virtual object to aim at a target position; and
an item throwing module, configured to control, in response to a release of the press operation, the virtual object to throw the target virtual item to the target position.

In one implementation, the apparatus further includes:
an icon selection module, configured to set the target item icon to a selected state in a case that the press operation moves to the target item icon.

In one implementation, an object control module is configured to control, in a case that a duration of the target item icon in the selected state reaches the target duration, the virtual object to hold the target virtual item.

In one implementation, the icon display module includes:
a first display unit, configured to display the plurality of item icons in a second region adjacent to a first region after the press operation on the throw button is detected, the first region being a region in which the throw button is located.

In one implementation, the second region is an annular region, and the first region is located at a center of the annular region; alternatively,
the second region is a rectangular region, and the first region is below the rectangular region.

In one implementation, the icon display module includes:
a second display unit, configured to display the plurality of item icons after the press operation on the throw button is detected and in response to the press operation moving out of the throw button.

In one implementation, the apparatus further includes:
a display switching module, configured to display the target item icon in the throw button in a case that the duration reaches the target duration.

In one implementation, the apparatus further includes:
a canceling display module, configured to cancel the display of the plurality of item icons in a case that the duration reaches the target duration.

In one implementation, the apparatus further includes:
a countdown display module, configured to display a function trigger countdown of the target virtual item in a case that the duration reaches the target duration, the function trigger countdown referring to a duration between a current time point and a trigger time point of a function of the target virtual item.

In one implementation, the aiming control module includes:
a trajectory display unit, configured to display a throw trajectory of the target virtual item;
a trajectory adjustment unit, configured to adjust the throw trajectory in response to the movement of the press operation and according to position change information of the press operation; and
a position determining unit, configured to determine a destination point of the throw trajectory as the target position.

In one implementation, the object control module includes:

a state setting unit, configured to control, in a case that the press operation moves to the target item icon and the duration reaches the target duration, the virtual object to hold the target virtual item, and set the target virtual item to a ready-to-throw state; and the item throwing module includes:

an item throwing unit, configured to control, when the target virtual item is in the ready-to-throw state and in response to the release of the press operation, the virtual object to throw the target virtual item to the target position.

In one implementation, the apparatus further includes:

a throw canceling module, configured to cancel the ready-to-throw state of the target virtual item in response to canceling the press operation on the throw button.

In one implementation, the apparatus further includes:

a color switching module, configured to switch, in a case that the press operation moves to the target item icon, a background color of a region in which the target item icon is located to a prompt color.

In another aspect, a virtual item control apparatus is provided, including:

an operation detection module, configured to display a target item icon in a throw button;

an object control module, configured to control, in a case that a duration of a press operation on the target item icon reaches a target duration, a virtual object to hold a target virtual item corresponding to the target item icon;

an aiming control module, configured to control, in response to a movement of the press operation, the virtual object to aim at a target position; and an item throwing module, configured to control, in response to a release of the press operation, the virtual object to throw the target virtual item to the target position.

In one implementation, the operation detection module is further configured to detect the press operation on the throw button in a case that the target item icon is displayed in the throw button.

In one implementation, the apparatus further includes:

a countdown display module, configured to display a function trigger countdown of the target virtual item in a case that the duration reaches the target duration, the function trigger countdown referring to a duration between a current time point and a trigger time point of a function of the target virtual item.

In one implementation, the aiming control module includes:

a trajectory display unit, configured to display a throw trajectory of the target virtual item;

a trajectory adjustment unit, configured to adjust the throw trajectory in response to the movement of the press operation and according to position change information of the press operation; and a position determining unit, configured to determine a destination point of the throw trajectory as the target position.

In one implementation, the object control module includes:

a state setting unit, configured to control, in a case that the duration reaches the target duration, the virtual object to hold the target virtual item, and set the target virtual item to a ready-to-throw state; and the item throwing module includes:

an item throwing unit, configured to control, in a case that the target virtual item is in the ready-to-throw state and in response to the release of the press operation, the virtual object to throw the target virtual item to the target position.

In one implementation, the apparatus further includes:

a throw canceling module, configured to cancel the ready-to-throw state of the target virtual item in response to canceling the press operation on the throw button.

Exemplarily, the apparatus further includes:

a color switching module, configured to switch a background color of a region in which the throw button is located to a prompt color.

In another aspect, a terminal is provided, including a processor and a memory, the memory storing at least one piece of program code, the at least one piece of program code being loaded and executed by the processor to implement the operations performed in the virtual item control method according to the foregoing aspects.

In another aspect, a non-transitory computer-readable storage medium is provided, storing at least one piece of program code, the at least one piece of program code being loaded and executed by a processor to implement the operations performed in the virtual item control method according to the foregoing aspects.

In another aspect, a non-transitory computer program product or a computer program is provided, the computer program product or the computer program including computer program code, the computer program code being stored in a computer-readable storage medium, a processor of a terminal reading the computer program code from the computer-readable storage medium, and the processor executing the computer program code to cause the terminal to perform the operations performed in the virtual item control method according to the foregoing aspects.

In the method and apparatus, the terminal, and the storage medium provided in the embodiments of this disclosure, the display, selection, aiming, and throwing of the virtual item can be completed only when a user is required to perform one continuous and coherent press operation, so that the operation is smoother, and a plurality of different operations do not need to be performed, thereby simplifying the operation procedure and improving the efficiency of throwing the virtual item.

BRIEF DESCRIPTION OF THE DRAWINGS

To describe the technical solutions in embodiments of this disclosure more clearly, the following briefly introduces the accompanying drawings required for describing the embodiments. Apparently, the accompanying drawings in the following description show only some of the embodiments of this disclosure, and a person of ordinary skill in the art may still derive other accompanying drawings from the accompanying drawings without creative efforts.

DESCRIPTION OF EMBODIMENTS

Figure 1:
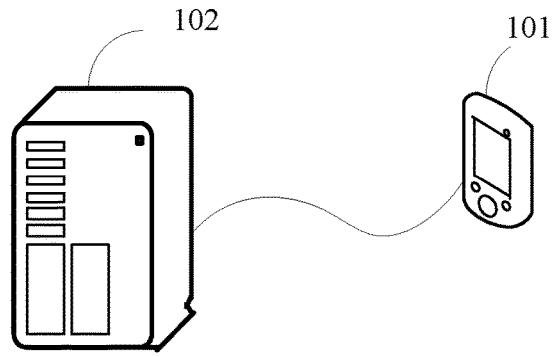
FIG. 1 is a schematic diagram of an implementation environment according to an embodiment of this disclosure.

To make objectives, technical solutions, and advantages of the embodiments of this disclosure clearer, the following further describes implementations of this disclosure in detail with reference to the accompanying drawings.

It may be understood that, the terms "first", "second", and the like used in this disclosure may be used for describing various concepts in this specification. However, the concepts are not limited by the terms unless otherwise specified. The terms are merely used for distinguishing one concept from another concept. For example, without departing from the scope of this disclosure, a first region may be referred to as a second region, and similarly, the second region may be referred to as the first region. At least one refers to one or more than one. For example, a plurality of item icons may be any integer quantity of item icons greater than or equal to one such as one item icon, two item icons, or three item icons.

A virtual scene involved in this disclosure is used for simulating a three-dimensional (3D) virtual space, the 3D virtual space may be an open space, and the virtual scene is used for simulating a real environment in reality. For example, the virtual scene includes the sky, the land, the ocean, or the like. The land includes environmental elements such as a desert and a city. Certainly, the virtual scene further includes virtual items such as a projectile, a building, a vehicle, a prop such as a weapon that is required by a virtual object in the virtual scene and is used for arming the virtual object or battling with other virtual objects. The virtual scene is further used for simulating a real environment under a different weather, for example, a weather such as a sunny day, a rainy day, a foggy day or a dark night. Various scene elements enhance the diversity and authenticity of the virtual scene.

A user controls a virtual object to move in the virtual scene, the virtual object may be a virtual image used for representing the user in the virtual scene, and the virtual image is in any form, such as a person or an animal. This is not limited in this disclosure. Using an electronic game as an example, the electronic game is a first-person shooting game, a third-person shooting game, or another electronic game in which hot weapons are used for remote attacks. Using a shooting game as an example, in the virtual scene, the user may control the virtual object to fall freely, glide, or fall after a parachute is opened in the sky; alternatively, to run, jump, creep, or bend forward in the land; alternatively, control the virtual object to swim, float, or dive in the ocean. Certainly, the user may further control the virtual object to ride in a vehicle to move in the virtual scene. The user may further control the virtual object to get in and out of a building in the virtual scene, discover and pick up a virtual item (for example, a prop such as a projectile or a weapon) in the virtual scene, and use the picked virtual item to battle with other virtual objects. For example, the virtual item is clothing, a helmet, a bulletproof vest, a medical product, a cold weapon, a hot weapon, or the like, or is a virtual item left after other virtual objects are eliminated. Herein, the foregoing scenario is merely used as an example for description, and this is not specifically limited in this embodiment of this disclosure.

In this embodiment of this disclosure, an electronic game scene is used as an example. A user performs an operation on a terminal in advance. After detecting the operation of the user, the terminal downloads a game configuration file of an electronic game. The game configuration file includes an application program, interface display data, virtual scene data, or the like of the electronic game, so that the user invokes the game configuration file when logging in to the electronic game on the terminal, to render and display an interface of the electronic game. The user performs a touch operation on the terminal. After detecting the touch operation, the terminal determines game data corresponding to the touch operation and renders and displays the game data. The game data includes virtual scene data, behavioral data of a virtual object in the virtual scene, and the like.

The terminal displays the virtual scene in a full screen when rendering and displaying the virtual scene; alternatively, the terminal independently displays a global map in a first preset region on a current display interface when displaying the virtual scene on the current display interface; alternatively, the terminal displays a global map only when detecting a click operation on a preset button. The global map is used for displaying a thumbnail of the virtual scene, and the thumbnail is used for describing geographic features corresponding to the virtual scene, such as topography, a landform, and a geographic location. The terminal may further display a thumbnail of a virtual scene within a specific distance around the current virtual object on the current display interface. When detecting a click operation on the global map, the terminal displays a thumbnail of an overall virtual scene in a second preset region of the current display interface, so that the user can view not only the virtual scene around the user, but also the overall virtual scene. When detecting a zooming operation on the full thumbnail, the terminal may zoom and display the full thumbnail. Exemplarily, specific display positions and shapes of the first preset region and the second preset region are set according to users' operation habits. For example, to prevent the virtual scene from being excessively blocked, the first preset region is a rectangular region in an upper right corner, a lower right corner, an upper left corner, or a lower left corner of the current display interface, the second preset region is a square region on a right or left side of the current display interface, or the first preset region and the second preset region are circular regions or regions of other shapes.

Specific display positions and shapes of the preset regions are not limited in this embodiment of this disclosure.

FIG. 1 is a schematic diagram of an implementation environment according to an embodiment of this disclosure. As shown in FIG. 1, the implementation environment includes a terminal 101 and a server 102.

Exemplarily, the terminal 101 is a smartphone, a tablet computer, a notebook computer, a desktop computer, a smart speaker, a smart television, a smartwatch, or the like, but is not limited thereto. Exemplarily, the server 102 is an independent physical server; alternatively, the server 102 is a server cluster or a distributed system including a plurality of physical servers; alternatively, the server 102 is a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence (AI) platform. The terminal 101 and the server 102 are directly or indirectly connected in a wired or wireless communication manner. This is not limited in this disclosure.

The server 102 provides a virtual scene for the terminal 101. The terminal 101 may display a virtual scene interface by using the virtual scene provided by the server 102, and may display a virtual object, a virtual item, and the like in the virtual scene interface, and the terminal 101 may control the virtual scene based on the virtual scene interface. The server 102 is configured to perform backend processing according to the control of the terminal 101 on the virtual scene, to provide backend support for the terminal 101.

Exemplarily, the terminal 101 is installed with a game application. The game application is an application provided by the server 102, or an application in an operating system of the terminal 101, or an application provided by a third party. The terminal 101 interacts with the server 102 by using the game application.

The virtual item control method provided in the embodiments of this disclosure is applicable to an electronic game scene, for example, a scene in which the virtual object throws a grenade.

When intending to control the virtual object to throw the grenade, the user performs a press operation on a throw button in the virtual scene interface, and an item wheel is invoked, the item wheel including virtual items that the virtual object has obtained. The user moves the press operation to the grenade, that is, performs the press operation on the grenade. The user continues to press the grenade, and when a duration of the press operation on the grenade reaches 0.4 seconds, the virtual object switches a gun in hands to the grenade, and the user then aims at a target position. When the user loosens the hands to release the grenade, the press operation is released, and the virtual object throws the grenade to the target position. In the whole process, the display, selection, aiming and throwing of the grenade can be completed only through one continuous press operation actually performed by the user.

Figure 2:
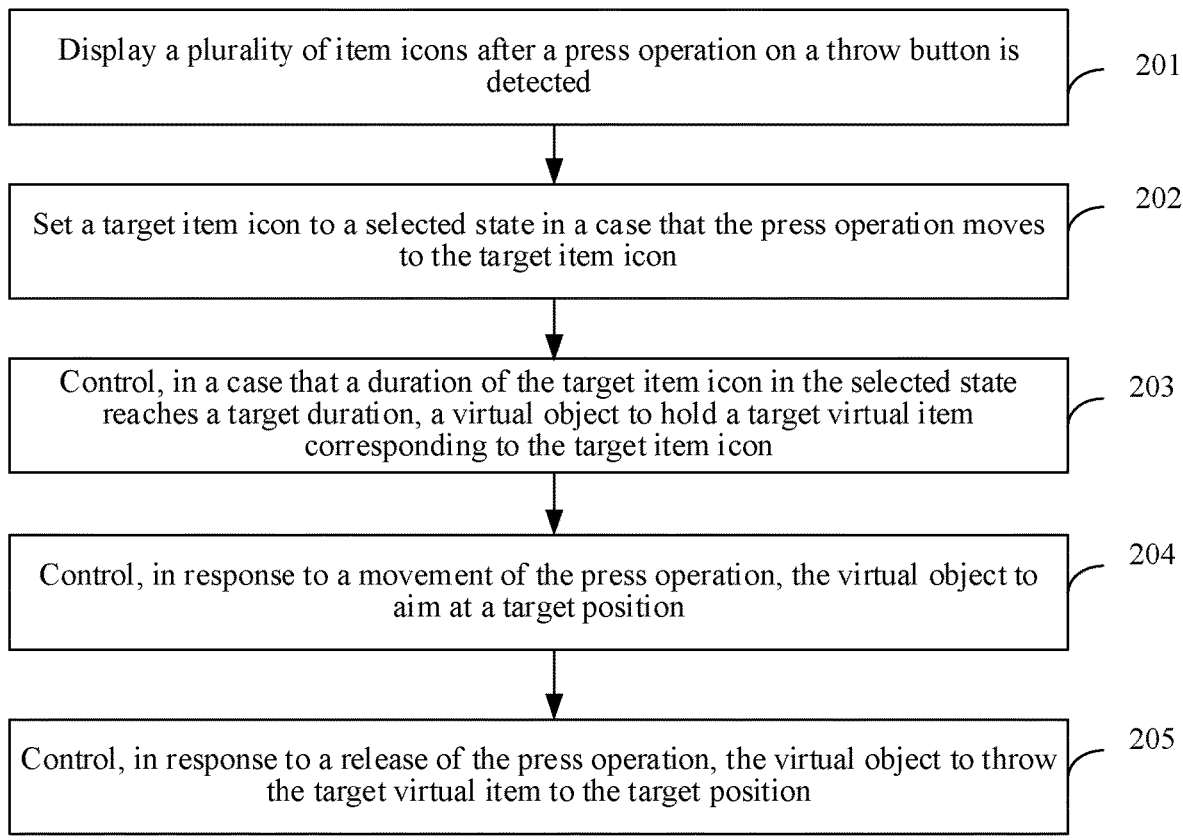
FIG. 2 is a flowchart of a virtual item control method according to an embodiment of this disclosure.

FIG. 2 is a flowchart of a virtual item control method according to an embodiment of this disclosure. This embodiment of this disclosure is executed by a terminal. Referring to FIG. 2, the method includes the following steps:

201. Display a plurality of item icons after a press operation on a throw button is detected.

The terminal displays a virtual scene interface, and the virtual scene interface includes a virtual scene within a viewing angle range of a virtual object. The virtual scene interface includes a throw button, and by using the throw button, a plurality of item icons, item selection icons, virtual items corresponding to item throwing icons, or the like may be displayed. When a plurality of functions are integrated in one throw button, different functions can be implemented by using different forms of press operations on the throw button. After detecting the press operation on the throw button, the terminal displays the plurality of item icons.

The virtual item corresponding to the item icon can be a throwable virtual item in the virtual scene, such as a grenade, a smoke grenade, a molotov cocktail, or a shock bomb. The plurality of item icons include a target item icon.

202. Set a target item icon to a selected state in response to the press operation moving to the target item icon.

When intending to control the virtual object to throw a target virtual item, the user moves the press operation to the target item icon of the target virtual item, and the terminal sets the target item icon to a selected state in response to the press operation being moved to the target item icon.

203. Control, in response to a duration of the target item icon in the selected state reaching a target duration, a virtual object to hold a target virtual item corresponding to the target item icon.

After the user moves the press operation to the target item icon, if the user determines to control the virtual object to throw the target virtual item, the user continues to perform the press operation on the target item icon to keep the target item icon being in a selected state. If a duration of the target item icon in the selected state reaches a target duration, the terminal controls the virtual object to hold the target virtual item. The target duration is set by the terminal. For example, the target duration is 0.4 seconds, 0.6 seconds, or the like.

204. Control, in response to a movement of the press operation, the virtual object to aim at a target position.

If the user intends to throw the target virtual item to a target position, the user moves the press operation, and adjusts an aiming position of the target virtual item to make the virtual object aim at the target position. The terminal controls, in response to a movement of the press operation, the virtual object to aim at the target position.

205. Control, in response to a release of the press operation, the virtual object to throw the target virtual item to the target position.

After controlling the virtual object to hold the target virtual item and aim at the target position, the user may stop the press operation on the target item icon, and the terminal controls, in response to a release of the press operation, the virtual object to throw the held target virtual item to the target position. The press operations in step 201 to step 205 are a continuous same operation. That is, the press operation starts from step 201, continues to be performed, and stops in step 205.

The foregoing step 201 to step 205 include: displaying a plurality of item icons after a press operation on a throw button is detected, the plurality of item icons including a target item icon; controlling, in response to the press operation moving to the target item icon and a duration reaches a target duration, a virtual object to hold a target virtual item corresponding to the target item icon, the duration being a duration of the press operation on the target item icon; controlling, in response to a movement of the press operation, the virtual object to aim at a target position; and controlling, in response to a release of the press operation, the virtual object to throw the target virtual item to the target position.

The target item icon is set to the selected state in response to the press operation moving to the target item icon. Therefore, that the target item icon is in the selected state indicates that the press operation moves to the target item icon. That the duration of the target item icon in the selected state reaches the target duration indicates that the duration of the press operation on the target item icon reaches the target duration. Therefore, the terminal controls, in response to the duration of the target item icon in the selected state reaching the target duration, the virtual object to hold the target virtual item.

In the related art, the user first performs a press operation on an item expansion button to display the virtual item, further performs a press operation on the virtual item, and then performs a press operation on the throw button to control the virtual object to throw the virtual item. In the foregoing method, the throwing of the virtual item can be implemented only when the user is required to perform a plurality of press operations, resulting in cumbersome operations and low efficiency.

In the method provided in the embodiments of this disclosure, the display, selection, aiming, and throwing of the virtual item can be completed only when a user is required to perform one continuous and coherent press operation, so that the operation is smoother, and a plurality of different operations do not need to be performed, thereby simplifying the operation procedure and improving the efficiency of throwing the virtual item.

Figure 3:
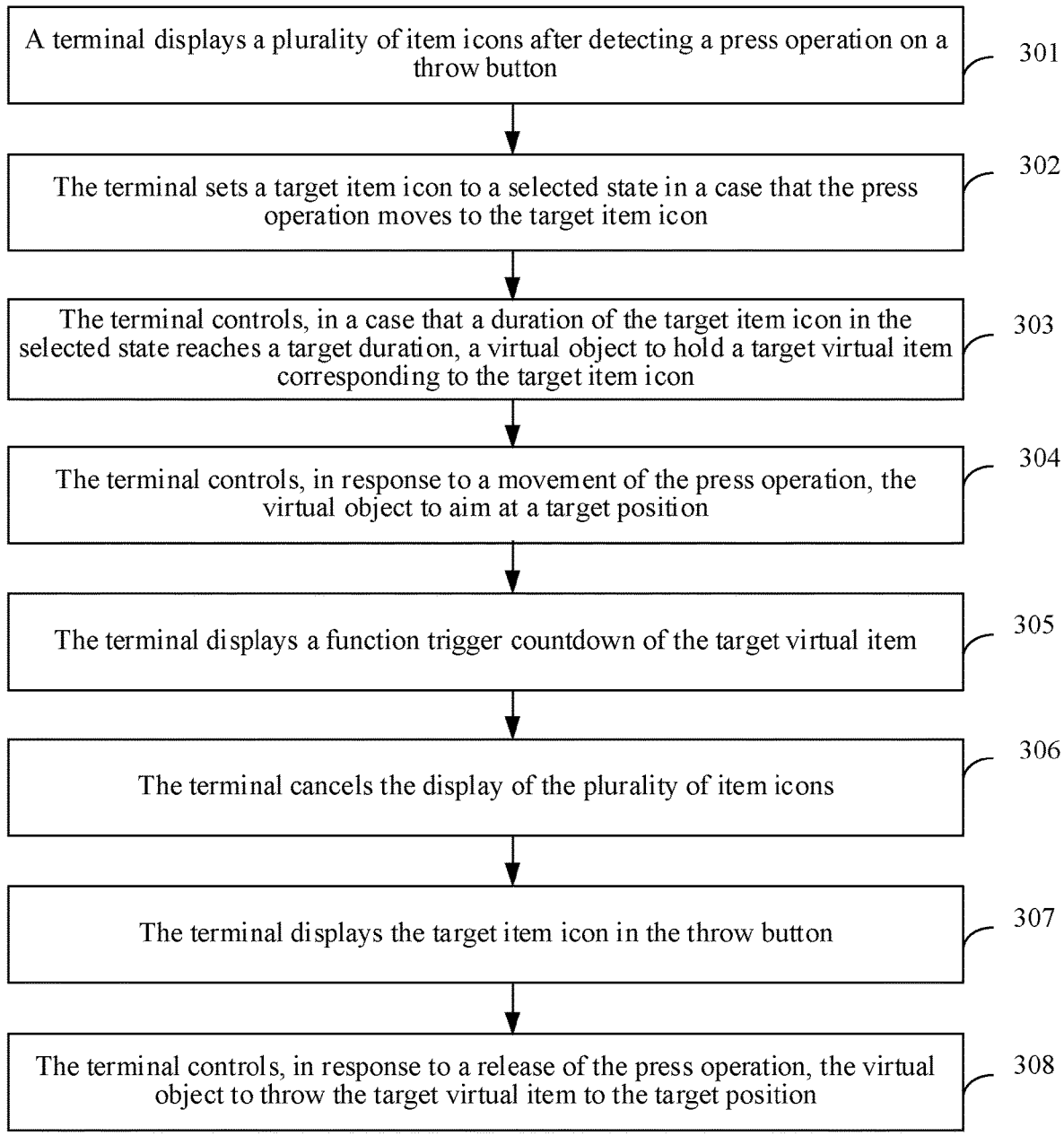
FIG. 3 is a flowchart of a virtual item control method according to an embodiment of this disclosure.

FIG. 3 is a flowchart of a virtual item control method according to an embodiment of this disclosure. This embodiment of this disclosure is executed by a terminal. Referring to FIG. 3, the method includes the following steps:

301. A terminal displays a plurality of item icons after detecting a press operation on a throw button.

The virtual scene includes a virtual object and a virtual item. The virtual item involved in this embodiment of this disclosure is a throwable virtual item. For example, the virtual item includes a grenade, a molotov cocktail, a smoke grenade, or a shock bomb.

The terminal displays a virtual scene interface, and the virtual scene interface includes a virtual scene within a viewing angle range of a virtual object. The virtual scene interface includes a throw button, and by using the throw button, item icons, item selection icons, virtual items corresponding to item throwing icons, or the like may be displayed. When a plurality of functions are integrated in one throw button, different functions can be implemented by using different forms of press operations on the throw button.

Exemplarily, the virtual scene interface further includes a river, underbrush, land, a building, and a virtual resource used by the virtual object in the virtual scene. Exemplarily, the virtual scene interface further includes a small map, a plurality of action buttons, a virtual joystick area, and the like. The virtual joystick area is used for controlling the virtual object to walk and run in the virtual scene and adjust a viewing angle direction of the virtual object, the plurality of action buttons are used for controlling the virtual object to perform corresponding actions in the virtual scene, and the small map displays a position of the virtual object in the virtual scene. The user may control the virtual object by using the throw button, the virtual joystick area, and other action buttons in the virtual scene interface.

When intending to control the virtual object to throw the virtual item, the user needs to first select to throw a virtual item. Therefore, the user performs a press operation on the throw button through the virtual scene interface; after detecting the press operation on the throw button, the terminal displays a plurality of item icons for the user to choose. The plurality of item icons include a target item icon.

In an exemplary implementation, the terminal displays the plurality of item icons after detecting the press operation on the throw button and in response to the press operation moving out of the throw button.

The user performs a press operation on the throw button, where the press operation is located on the throw button when starting. When dragging the press operation out of the throw button, the user performs a drag operation on the throw button. In this case, if detecting that the press operation on the throw button has been moved out of the throw button, the terminal displays a plurality of item icons; for example, the terminal expands an annular region around the throw button to display the plurality of item icons. The press operation located on the throw button means that a contact point of the press operation is located on the throw button, and the contact point of the press operation is a contact point between a finger of the user and a terminal screen, or a contact point between another object (for example, a stylus) configured to perform the press operation and a terminal screen.

In an exemplary implementation, a display region of the throw button on the terminal is a detection region of the throw button, and is also referred to as a hot region of the throw button. After the touch, by using the finger or another object, the throw button is displayed on the terminal screen, the user keeps in contact with the screen, and drags the finger or the object to enable the contact point with the screen to move out of the detection region of the throw button. The terminal determines, in response to the contact point moving out of the detection region of the throw button, that the press operation on the throw button moves out of the throw button, and in this case, displays the plurality of item icons.

In an exemplary implementation, the throw button is located in a first region of the virtual scene interface. After detecting the press operation on the throw button, the terminal displays the plurality of item icons in a second region adjacent to the first region. The plurality of item icons are located in different regions in the second region respectively.

Exemplarily, the second region is an annular region, and the first region is located at a center of the annular region. That is, the second region surrounds the first region, and the plurality of item icons are distributed around the throw button. Exemplarily, if the second region is a rectangular region, and the first region is below the rectangular region, the plurality of item icons are distributed above the throw button. Alternatively, if the first region is above the rectangular region, the plurality of item icons are distributed below the throw button. The first region is a circle, a rectangle, a triangle, or the like. The second region may be in wheel style or another style.

Exemplarily, a background color of the first region is a first target color, to indicate that the region is a region in which the throw button is displayed; a background color of the second region is a second target color, to indicate that the region is a region in which the virtual item is displayed; alternatively, the terminal sets the first region and the second region to a semi-transparent state, to divide the first region and the second region from other regions.

In another exemplary implementation, after detecting the press operation on the throw button, the terminal displays icons of a plurality of virtual items that the virtual object has obtained. In the virtual scene, the obtained virtual items can be used only after the virtual object obtains the virtual items. Therefore, the terminal determines the plurality of virtual items that the virtual object has obtained, and displays the icons of the virtual items that have been obtained.

The virtual object is a virtual object corresponding to a user identifier that logs in currently. Exemplarily, after the terminal controls the virtual object to obtain the virtual item in the virtual scene, if the obtained virtual item is added to an item library of the virtual object, the terminal determines a plurality of virtual items included in the item library of the virtual object, and displays the icons of the plurality of virtual items in the item library after detecting the press operation on the throw button.

The item library of the virtual object includes a plurality of types of virtual items such as a throwable virtual item and a non-throwable virtual item. The non-throwable virtual item includes a virtual gun, an accessory of a virtual gun, a virtual drug used for treating the virtual object, or the like, and the throwable virtual item includes a grenade, a molotov cocktail, a smoke grenade, or the like. After detecting the press operation on the throw button, the terminal displays icons of the throwable virtual items in the item library.

In another exemplarily implementation, after detecting the press operation on the throw button, the terminal displays the icons of the plurality of virtual items provided in the virtual scene. Exemplarily, the terminal displays, in a first display mode, the icons of the plurality of virtual items that the virtual object has obtained, and displays, in a second display mode, icons of a plurality of virtual items that the virtual object does not obtain, to distinguish the virtual items that have been obtained from the virtual items that are not obtained, and the icons of the plurality of virtual items that are not obtained are in an unselectable state, to make it convenient for the user to subsequently select the virtual items that have been obtained to throw. For example, the terminal sets the icons of the plurality of virtual items that have been obtained to multicolor, and sets the icons of the plurality of virtual items that are not obtained to gray; alternatively, the terminal sets a background color of a display region of the icons of the plurality of virtual items that have been obtained to multicolor, and sets a background color of a display region of the icons of the plurality of virtual items that are not obtained to gray.

In another exemplarily implementation, after detecting the press operation on the throw button, the terminal displays the plurality of item icons and displays a quantity of virtual items that the virtual object has obtained. For example, if the virtual object has obtained 3 grenades and 2 smoke grenades, and does not obtain a molotov cocktail, the terminal displays a grenade icon, a smoke grenade icon, and a molotov cocktail icon. In addition, "3" is displayed below the grenade icon to indicate that the current virtual object has possessed 3 grenades, "2" is displayed below the smoke grenade icon to indicate that the current virtual object has possessed 2 smoke grenades, and "0" is displayed below the molotov cocktail icon to indicate that the current virtual object does not possess the molotov cocktail yet.

The embodiment of this disclosure is described only by using an example in which the item icons are displayed after the press operation on the throw button is detected. In another embodiment, the virtual scene interface further includes an item expansion button, and if the item expansion button is used for displaying the item icons, the terminal displays the plurality of item icons when detecting a press operation on the item expansion button. Exemplarily, the item expansion button is located in a region adjacent to the region in which the throw button is located. For example, the item expansion button is above the throw button.

Figure 4:
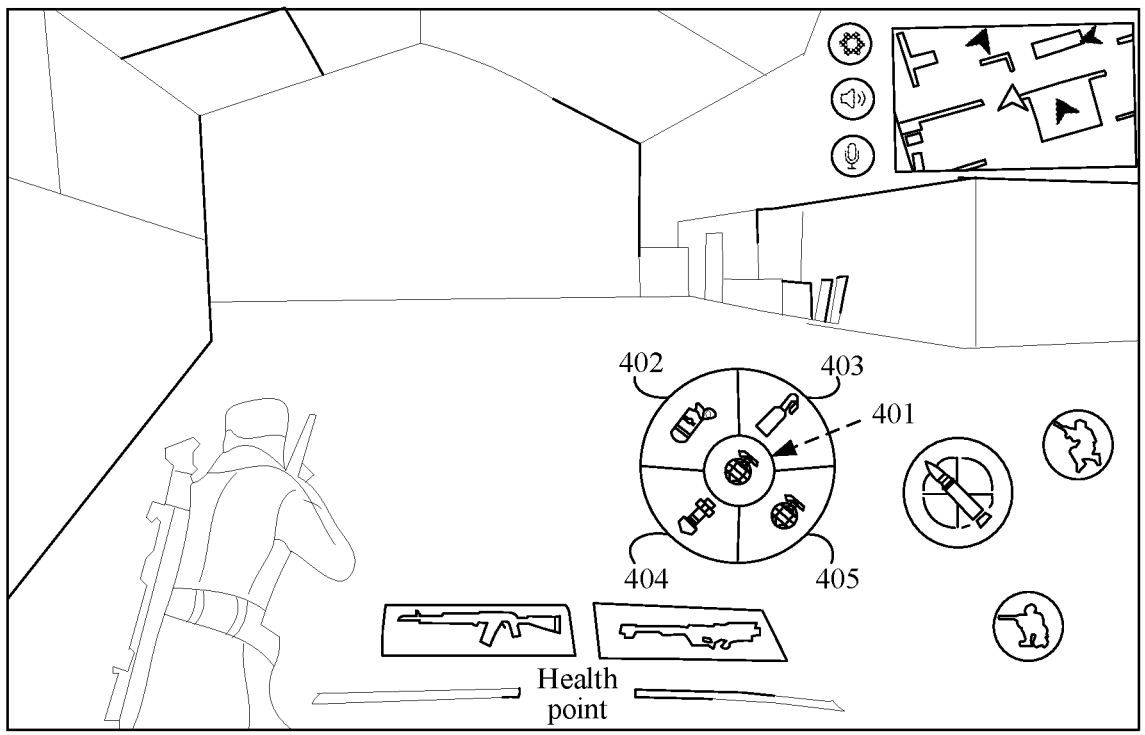
FIG. 4 is a schematic diagram of displaying item icons according to an embodiment of this disclosure.

FIG. 4 is a schematic diagram of displaying virtual items according to an embodiment of this disclosure. As shown in FIG. 4, a circular region 401 of a virtual scene interface displays a throw button, and the throw button displays a grenade icon. An annular region surrounds the circular region 401, and the annular region is equally divided into 4 fan-shaped regions, where a fan-shaped region 402 displays a smoke grenade icon, a fan-shaped region 403 displays a molotov cocktail icon, a fan-shaped region 404 displays a shock bomb icon, and a fan-shaped region 405 displays a grenade icon. As shown in FIG. 4, the circular region 401 and 4 fan-shaped regions form a wheel, and the wheel displays a throw button and the virtual items.

Figure 5:
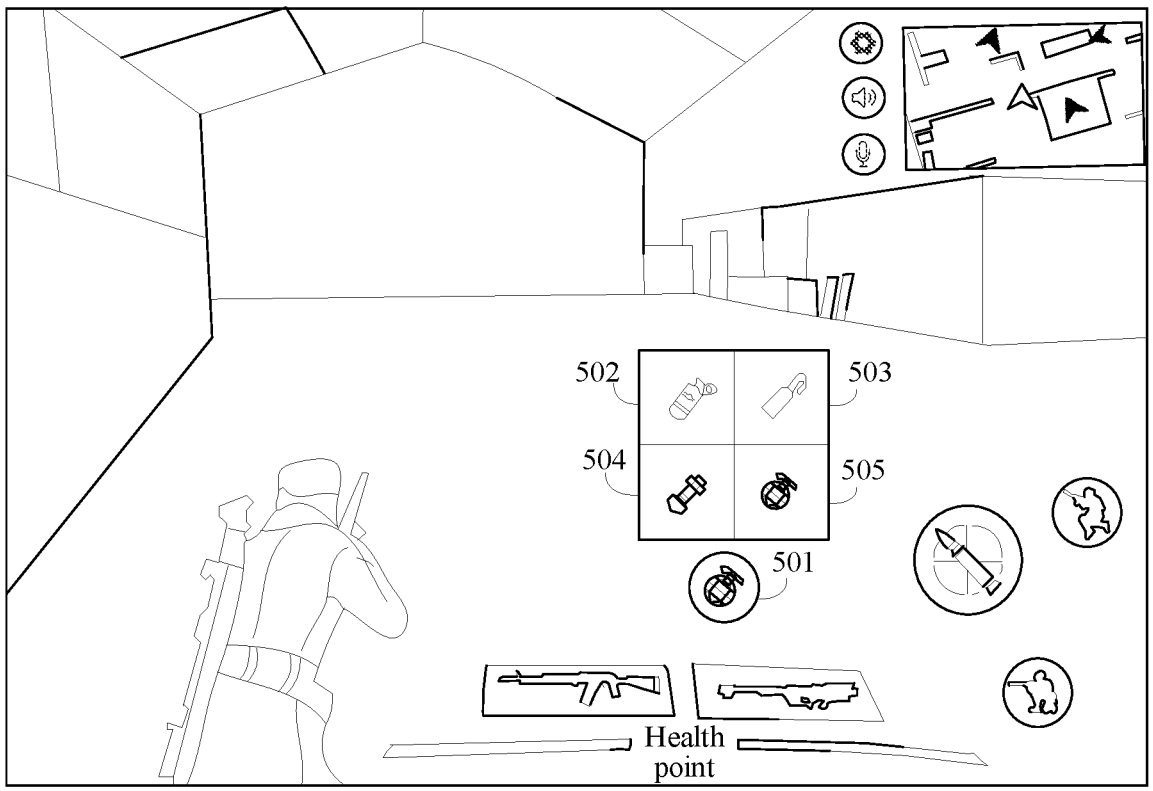
FIG. 5 is a schematic diagram of displaying item icons according to an embodiment of this disclosure.

FIG. 5 is a schematic diagram of displaying virtual items according to an embodiment of this disclosure. As shown in FIG. 5, a circular region 501 of a virtual scene interface displays a throw button, and the throw button displays a grenade icon. A rectangular region is above the circular region 501, and the rectangular region is equally divided into 4 small rectangular regions, where a small rectangular region 502 displays a smoke grenade icon, a small rectangular region 503 displays a molotov cocktail icon, a small rectangular region 504 displays a shock bomb icon, and a small rectangular region 505 displays a grenade icon.

302. The terminal sets a target item icon to a selected state in response to the press operation moving to the target item icon.

Exemplarily, a target virtual item corresponding to the target item icon is a virtual item that the virtual object has obtained. After the terminal displays a plurality of item icons, the user keeps in contact with a screen to continue to perform the press operation. If intending to choose the target virtual item, the user moves the press operation to the target item icon, and the terminal sets the target item icon to a selected state in response to the press operation moving to the target item icon. The selected state indicates that the target virtual item has been selected, and the target virtual item in the selected state may be subsequently processed according to a next operation of the user.

In an exemplary implementation, when the terminal displays the plurality of item icons, a region in which each item icon is located is a detection region of the item icon. If the user continues to keep in contact with the screen, and drags a finger or another object configured to perform the press operation to enable a contact point with the screen to move to a detection region of the target item icon, the terminal determines, in response to the contact point moving to the detection region of the target item icon, that the press operation is moved to the target item icon, that is, determines that the press operation on the target item icon is detected.

In an exemplary implementation, the terminal switches, in response to the press operation moving to the target item icon, a background color of a region in which the target item icon is located to a prompt color. That is, when the target item icon is in the selected state, the background color in which the target item icon is located is the prompt color. The prompt color is used for prompting the user that the press operation has been performed on the target item icon, so that the user directly learns, according to information displayed in the virtual scene interface, whether the target item icon is in the selected state.

In another embodiment, when a duration of the target item icon in the selected state does not reach a target duration, the terminal determines, in response to the press operation moving to another item icon in the plurality of item icons, that a press operation on another item icon is detected, sets another item icon to the selected state, and cancels the selected state of the target item icon.

For example, when the user moves the press operation to the target item icon, if the user does not intend to control the virtual object to throw the target virtual item, the user moves the press operation to another item icon when a duration of the press operation does not reach the target duration, to perform the press operation on another item icon.

Alternatively, when the plurality of item icons are displayed, regions in which the plurality of item icons are located are adjacent, and the user needs to move the press operation from the throw button to an item icon that the user intends to choose. To accelerate an operation speech and simplify a movement path, in a process of moving to the item icon that the user intends to choose, the press operation may first move to another item icon. Therefore, by using the foregoing method, a plurality of virtual items in the movement path may be determined, to determine a final virtual item to be thrown.

303. The terminal controls, in response to a duration of the target item icon in the selected state reaching a target duration, a virtual object to hold a target virtual item corresponding to the target item icon.

After the user moves the press operation to the target item icon, if the user determines to control the virtual object to throw the target virtual item, the user continues to keep in contact with the screen, and to keep the press operation still located on the target item icon, to continue to perform the press operation on the target item icon to keep the target item icon in the selected state. The terminal controls, in response to a duration of the target item icon in the selected state reaching a target duration, the virtual object to hold the target virtual item.

When the virtual object has no another virtual item in hands, the terminal controls the virtual object to hold the virtual item; and when the virtual object holds another virtual item, the terminal switches another virtual item in the hands of the virtual object to the target virtual item. For example, when the virtual object holds a virtual gun, the terminal controls the virtual object to put away the virtual gun, and then to hold the target virtual item.

The foregoing step 301 to step 303 are as follows: A terminal displays a plurality of item icons after detecting a press operation on a throw button, and controls, in response to the press operation moving to a target item icon and a duration reaches a target duration, a virtual object to hold a target virtual item corresponding to the target item icon, the duration being a duration of the press operation on the target item icon. The duration is a duration between a time point at which the press operation moves to the target item icon and a current time point, that is, a duration of pressing the target item icon. In an exemplary implementation, the terminal starts, in response to the press operation moving to the target item icon, timing the press operation on the target item icon. A duration obtained through timing is a duration of the press operation on the target item icon, that is, the duration of pressing the target item icon. The timing of the press operation ends when the terminal detects that the press operation moves out of the target item icon, or ends when the press operation releases, or ends when the duration obtained through timing reaches the target duration.

In another exemplarily implementation, if the terminal sets the target virtual item to the selected state in response to the press operation moving to the target item icon, the terminal controls, in response to the duration of the target item icon in the selected state reaching the target duration, the virtual object to hold the target virtual item, cancels the selected state of the target virtual item, and does not need to control the virtual object to throw the target virtual item, that is, does not need to perform the following step 304 to step 308.

304. The terminal controls, in response to a movement of the press operation, the virtual object to aim at a target position.

If the user intends to throw the target virtual item to a target position, the user moves the press operation, and adjusts a throw trajectory of the target virtual item to make the virtual object aim at the target position. The terminal controls, in response to a movement of the press operation, the virtual object to aim at the target position.

In an exemplary implementation, the terminal displays a throw trajectory of the target virtual item, adjusts the throw trajectory in response to the movement of the press operation and according to position change information of the press operation, and determines a destination point of the throw trajectory as the target position.

To facilitate the user in controlling the virtual object to throw the target virtual item, the terminal uses a position in which the target virtual item is located as a starting position, uses a shooting direction of a virtual camera of the virtual scene as a throwing direction of the target virtual item, draws a ray from the starting position along the throwing direction, uses an intersection between the ray and a specific object in the virtual scene as a destination position of the throw trajectory, uses an arc formed by connecting the starting position and the destination position as the throw trajectory of the target virtual item, and displays the throw trajectory, so that the user controls, according to the throw trajectory, the virtual object to throw the target virtual item. The destination position is the destination point of the throw trajectory, that is, a drop point of the target virtual item after the target virtual item is thrown according to the throw trajectory.

Exemplarily, the terminal adjusts the throw trajectory of the target virtual item according to a displacement size and a displacement direction of the press operation.

305. The terminal displays a function trigger countdown of the target virtual item.

The terminal displays a function trigger countdown of the target virtual item in the virtual scene interface while controlling, in response to the duration reaching the target duration, the virtual object to hold the target virtual item.

The target virtual item in the virtual scene has a corresponding function. For example, a grenade is used for causing damage to the virtual object through an explosion. The terminal controls, in response to the duration reaching the target duration, the virtual object to hold the target virtual item, and opens a safety catch of the target virtual item. After the safety catch of the target virtual item is opened, the target virtual item is activated, and a function of the target virtual item is automatically triggered after a preset duration. Therefore, the terminal synchronously displays the function trigger countdown of the target virtual item. The function trigger countdown refers to a duration between a current time point and a trigger time point of the function of the target virtual item, that is, a remaining duration until the function of the target virtual item is triggered.

For example, the target virtual item is a grenade, and the grenade automatically explodes at 5 seconds after being activated. The terminal displays an explosion countdown of 5 seconds in response to a press duration on the grenade reaching the target duration. In addition, subsequently as time goes by, the displayed explosion countdown is correspondingly reduced until the explosion countdown is 0, and the terminal controls the grenade to explode.

306. The terminal cancels the display of the plurality of item icons.

The terminal cancels the display of the plurality of item icons while controlling, in response to the duration reaching the target duration, the virtual object to hold the target virtual item.

In step 301, the terminal displays the plurality of item icons for the user to choose. The terminal controls, in response to the duration reaching the target duration, the virtual object to hold the target virtual item, which has completed a stage of selecting the virtual item, and enters a stage of throwing the virtual item, and consequently does not need to display the plurality of item icons again. To simplify the virtual scene interface and reduce an amount of displaying redundant information, the terminal cancels the display of the plurality of item icons.

307. The terminal displays the target item icon in the throw button.

The terminal displays a target item icon in the throw button while controlling, in response to the duration reaching the target duration, the virtual object to hold the target virtual item.

In this embodiment of this disclosure, the terminal controls, in response to a press duration on the target item icon reaching the target duration, the virtual object to hold the target virtual item. In this case, a throwing intention of the user is to throw the target virtual item, and consequently a possibility that a next throwing intention of the user is the target virtual item is higher than that of another virtual item. Therefore, the terminal displays the target item icon in the throw button, and subsequently the user may directly perform the press operation on the throw button, which is beneficial to accelerating the speed of selecting the virtual item, simplifying the operations, and saving the operation time. In another aspect, the target item icon is displayed in the throw button, to also prompt the user that the virtual item currently held by the virtual object is the target virtual item.

Exemplarily, if the item icon is displayed in the current throw button, the terminal switches the item icon currently displayed in the throw button to the target item icon.

The foregoing step 303 to step 306 are all operations performed by the terminal in response to the duration reaching the target duration, and the embodiment of this disclosure is described only by using execution according to a sequence of step 303 to step 306 as an example. In another embodiment, the terminal synchronously performs step 303 to step 306 in response to the duration reaching the target duration. Alternatively, in another embodiment, it only needs to be ensured that the terminal performs step 303 in response to the duration reaching the target duration, and does not perform all steps in step 304 to step 306, or only performs any one or any two of the steps.

308. The terminal controls, in response to a release of the press operation, the virtual object to throw the target virtual item to the target position.

After the virtual object holds the target virtual item, the user may stop the press operation on the target item icon only after adjusting a throw trajectory of the target virtual item, and the terminal controls, in response to a release of the press operation, the virtual object to throw the held target virtual item to the target position. If the finger of the user leaves the screen, and the contact point of the press operation disappears, the press operation releases.

In the related art, the user needs to first perform a press operation of an item expansion button to display the item icons, then perform a press operation of an item icon to complete the selection and holding of a virtual item, and further perform a press operation of the throw button to complete the throwing of the virtual item. Therefore, the user performs a plurality of press operations on different objects, resulting in that the operations are cumbersome, and it is difficult to complete the throwing operation in time in an emergency. For example, when two camps battle with each other, if a teammate is injured, the virtual object needs to quickly throw a smoke grenade while maintaining a combat capability, to protect the virtual object to heal the teammate. In this case, if the throwing operation is cumbersome, the user cannot quickly throw the smoke grenade, and consequently cannot use the smoke grenade in time; alternatively, the virtual object cannot fight a battle for a long time and is knocked down due to a relatively long throwing process.

However, in this embodiment of this disclosure, the user performs the press operation on the throw button, invokes the item icons, moves the press operation to an item icon, completes the selection of the virtual item, continues to perform the press operation, completes the holding of the virtual item, moves the press operation to perform throwing and aiming, stops performing the press operation, and completes the throwing of the virtual item. Therefore, according to the duration of the press operation on the item icon, one press operation is divided into a display operation stage, a selection operation stage, a throwing and aiming stage, and a throwing operation phase of the virtual item. The display, selection, aiming, and throwing of the virtual item can be completed only by performing one continuous and coherent press operation, and compared with the related art, this simplifies the operation process, so that the operation is smoother, and the operation efficiency can be improved. Therefore, when meeting the foregoing battle situation, the virtual object can quickly throw the virtual item, thereby improving the battle efficiency and experience.

In an exemplary implementation, in the process of throwing the virtual item, the virtual item is first set to a ready-to-throw state, and the virtual item in the ready-to-throw state is then thrown. The foregoing step 303 and step 308 are replaced with the following steps: controlling, by the terminal in response to a duration reaching a target duration, a virtual object to hold a target virtual item, and setting the target virtual item to a ready-to-throw state; and controlling, by the terminal when the target virtual item is in the ready-to-throw state and in response to a release of the press operation, the virtual object to throw the target virtual item.

When the press operation continues to be performed, the target virtual item is set to the ready-to-throw state. If the terminal detects the release of the press operation, and the target virtual item is in the ready-to-throw state, it indicates that it is ready to throw the target virtual item, and the terminal controls the virtual object to throw the target virtual item.

Exemplarily, if the terminal sets the target virtual item to the selected state in response to the press operation moving to the target item icon, the terminal switches the target virtual item in the selected state to the ready-to-throw state in response to the duration of the target virtual item in the selected state reaching the target duration, and controls the virtual object to hold the target virtual item in the ready-to-throw state.

Exemplarily, the controlling, by the terminal, the target virtual item to be in the ready-to-throw state further includes at least one of the following: displaying, by the terminal, a function trigger countdown of the target virtual item; displaying, by the terminal, a throw trajectory of the target virtual item; controlling, by the terminal, the virtual object to hold the target virtual item to be kept in the ready-to-throw state; and controlling, by the terminal, the virtual object to hold the target virtual item and open a safety catch of the target virtual item. After the safety catch of the target virtual item is opened, the target virtual item is activated, and the function of the target virtual item is automatically triggered after the preset duration.

The foregoing steps are described only by using an example in which the target virtual item in the ready-to-throw state is thrown. In another embodiment, after holding the target virtual item in the ready-to-throw state, the virtual object may further cancel the throwing of the target virtual item. After the terminal sets the target virtual item to the ready-to-throw state in response to the duration reaching the target duration, the terminal cancels the ready-to-throw state of the target virtual item in response to canceling the press operation on the throw button. Subsequently, even if the terminal detects the release of the press operation, because the target virtual item is not in the ready-to-throw state, and it indicates that it is not ready to throw the target virtual item, the terminal does not need to control the virtual object to throw the target virtual item.

For example, the user performs the press operation on the target item icon by using one hand, and the target virtual item is set to the ready-to-throw state in response to the duration of the press operation on the target item icon reaching the target duration. In this case, if the user intends to interrupt the throwing procedure, the user cancels the press operation on the throw button by using the other hand, so that the terminal cancels the ready-to-throw state of the target virtual item. Subsequently, the user stops the press operation on the target item icon, and the terminal does not control the virtual object to throw the target virtual item either.

Exemplarily, when canceling the ready-to-throw state of the target virtual item, the terminal controls the virtual object to put away the target virtual item, or continues to control the virtual object to hold the target virtual item. This is not limited in this disclosure.

The foregoing steps only describe a case that the target virtual item is set to the ready-to-throw state in response to the duration of the press operation on the target item icon reaching the target duration. In an exemplary implementation, the duration of the press operation on the target item icon does not reach the target duration yet, and if the user now intends to interrupt the throwing process, the press operation may stop before the duration reaches the target duration. The terminal does not need to control, when the duration does not reach the target duration and in response to the release of the press operation, the virtual object to hold the target virtual item.

In another exemplarily implementation, the terminal sets the target virtual item to the selected state in response to the press operation moving to the target item icon. The terminal detects the release of the press operation in response to the duration of the target virtual item in the selected state not reaching the target duration, and controls the virtual object to hold the target virtual item in the selected state. In this case, the target virtual item is held by only the virtual object, but is not ready for being thrown. Therefore, no throwing and aiming is performed. After the virtual object holds the target virtual item in the selected state, the following two cases are further included.

In a first case, when the virtual object holds the target virtual item in the selected state, if the user intends to cancel the virtual object holding the target virtual item, the press operation on the throw button is performed again, and it is ensured that the duration of the press operation on the throw button is less than the target duration, so that the terminal cancels the virtual object holding the target virtual item.

In a second case, when the virtual object holds the target virtual item in the selected state, if the user intends to control the virtual object to throw the target virtual item, the press operation on the throw button is performed again, and it is ensured that the duration of the press operation on the throw button reaches the target duration, so that the terminal switches the target virtual item in the selected state to the ready-to-throw state.

In the method provided in the embodiments of this disclosure, the display, selection, aiming, and throwing of the virtual item can be completed only when a user is required to perform one continuous and coherent press operation, so that the operation is smoother, and a plurality of different operations do not need to be performed, thereby simplifying the operation procedure and improving the efficiency of throwing the virtual item.

In addition, because the method provided in the embodiments of this disclosure can simplify the operation procedure and improve the throwing efficiency, the virtual object can quickly throw the virtual item, thereby improving the battle efficiency and experience in the game scene.

In addition, a second region in which the item icons are displayed is adjacent to a first region in which the throw button is displayed, to facilitate in the user moving the press operation on the throw button to the item icon, thereby simplifying a movement path of the press operation, further accelerating the operation speed, and making the process of selecting the virtual item quicker.

In addition, after the press operation moves to the target item icon, if it intends that the target virtual item to be thrown is switched to another virtual item, the press operation only needs to continue to move to another item icon. Therefore, the operation process is smoother.

In addition, if the selection of the virtual item is completed in response to the duration reaching the target duration, the display of the plurality of item icons is canceled, thereby reducing an amount of displaying redundant information and simplifying the virtual scene interface.

In addition, the item icon displayed in the throw button is switched to the target item icon, to facilitate in the user subsequently directly performing the press operation on the throw button to select to throw the target virtual item, thereby accelerating the speed of selecting the virtual item and saving the operation time.

In addition, when it is detected that the press operation moves to the target item icon, a background color of the region in which the target virtual item is located is switched to the prompt color, so that the user can directly learn, according to the background color, whether the target virtual item is currently selected.

Figure 6:
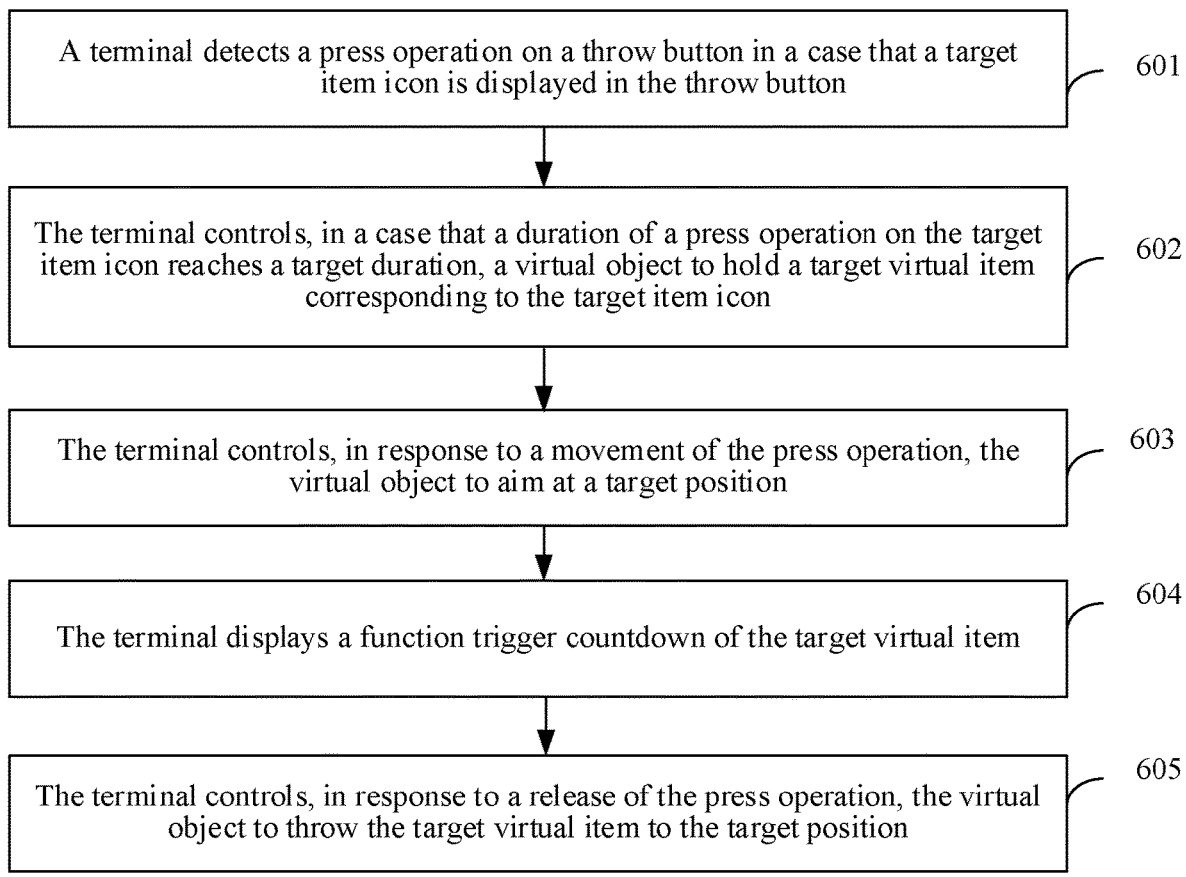
FIG. 6 is a flowchart of a virtual item control method according to an embodiment of this disclosure.

FIG. 6 is a flowchart of another virtual item control method according to an embodiment of this disclosure. This embodiment of this disclosure is executed by a terminal. Referring to FIG. 6, the method includes the following steps:

601. A terminal detects a press operation on a throw button in response to a target item icon being displayed in the throw button.

That the item icons are displayed in the throw button means that the item icons are displayed in a region in which the throw button is located. For example, if the throw button is circular, the item icons are further displayed in the circular throw button.

In an exemplary implementation, the item icons displayed in the throw button are icons of a plurality of virtual items provided in the virtual scene, and according to an arrangement order of the item icons, switches a currently displayed item icon to a next item icon at an interval of a preset duration. That is, the terminal periodically and cyclically displays the plurality of item icons according to the arrangement order of the item icons. For example, four types of virtual items, namely, a grenade, a molotov cocktail, a smoke grenade, and a shock bomb are provided in the virtual scene. The throw button switches the currently displayed item icon to the next item icon every 5 minutes according to an arrangement order of a grenade icon, a molotov cocktail icon, a smoke grenade icon, and a shock bomb icon.

In another exemplarily implementation, the item icons displayed in the throw button are icons of a plurality of virtual items that the virtual object has obtained, and according to an arrangement order of the item icons, switches a currently displayed item icon to a next item icon at an interval of a preset duration.

In another exemplarily implementation, the item icon displayed in the throw button is an icon of a virtual item that the virtual object throws for the last time. That is, each time the virtual object completes the throwing of the virtual item, the terminal switches the item icon displayed in the throw button to an icon of a virtual item that the virtual object throws for this time.

Therefore, if the user intends to select a target virtual item to throw, and the item icon displayed in the throw button is just an icon of the target virtual item, the user may directly perform the press operation on the throw button.

In another exemplarily implementation, when detecting the press operation on the throw button, the terminal switches a background color of the region in which the throw button is located to a prompt color. The prompt color is used for prompting the user that the press operation has been performed on the throw button, so that the user can learn, according to information displayed in the virtual scene interface, whether the target virtual item is selected to perform throwing.

602. The terminal controls, in response to a duration of a press operation on the target item icon reaching a target duration, a virtual object to hold a target virtual item corresponding to the target item icon.

After the user performs the press operation on the throw button, if the user determines to control the virtual object to throw the target virtual item, the user continues to keep in contact with a screen, and to keep the press operation still located on the throw button, to continue to perform the press operation on the throw button. The terminal controls, in response to the duration of the press operation on the target item icon reaching the target duration, the virtual object to hold the target virtual item.

603. The terminal controls, in response to a movement of the press operation, the virtual object to aim at a target position.

In an exemplary implementation, the terminal displays a throw trajectory of the target virtual item, adjusts the throw trajectory according to position change information of the press operation, and determines a destination point of the throw trajectory as the target position.

604. The terminal displays a function trigger countdown of the target virtual item.

605. The terminal controls, in response to a release of the press operation, the virtual object to throw the target virtual item to the target position.

In an exemplary implementation, in the process of throwing the virtual item, if the virtual item is first set to a ready-to-throw state, and the virtual item in the ready-to-throw state is then thrown, the foregoing step 602 and step 605 further include the following steps: controlling, by the terminal in response to a duration of a press operation on the target item icon reaching a target duration, a virtual object to hold a target virtual item, and setting the target virtual item to a ready-to-throw state; and controlling, by the terminal when the target virtual item is in the ready-to-throw state and in response to a release of the press operation, the virtual object to throw the target virtual item to a target position.

The foregoing steps are described only by using an example in which the target virtual item in the ready-to-throw state is thrown. In another embodiment, after holding the target virtual item in the ready-to-throw state, the virtual object may further cancel the throwing of the target virtual item. After the terminal sets the target virtual item to the ready-to-throw state in response to the duration reaching the target duration, the terminal cancels the ready-to-throw state of the target virtual item in response to canceling the press operation on the throw button.

In addition to the foregoing description, other implementation processes of the foregoing step 602 to step 605 are similar to that of the foregoing step 303 to step 305 and step 308, and details are not described herein again.

The foregoing step 601 to step 605 are as follows: A terminal displays a target item icon in a throw button; controls, in response to a duration of a press operation on the target item icon reaching a target duration, a virtual object to hold a target virtual item corresponding to the target item icon; controls, in response to a movement of the press operation, the virtual object to aim at a target position; and controls, in response to a release of the press operation, the virtual object to throw the target virtual item to the target position.

The terminal detects the press operation on the throw button in response to the target item icon being displayed in the throw button.

In the method provided in the embodiments of this disclosure, when the target item icon is displayed in the throw button, the selection and aiming and throwing of the target virtual item can be completed by directly performing the press operation on the throw button, and there is no need to first press the throw button to display the item icons, and then select the virtual item to perform throwing, thereby simplifying the operation procedure, saving the operation time, and improving the efficiency of throwing the virtual item.

In addition, because the method provided in the embodiments of this disclosure can simplify the operation procedure and improve the throwing efficiency, the virtual object can quickly throw the virtual item, thereby improving the battle efficiency and experience in the game scene.

In addition, when the press operation on the throw button is detected, a background color of the region in which the throw button is located is switched to a prompt color, so that the user can learn, according to information displayed in the virtual scene interface, whether the target virtual item is selected to perform throwing.

Figure 7:
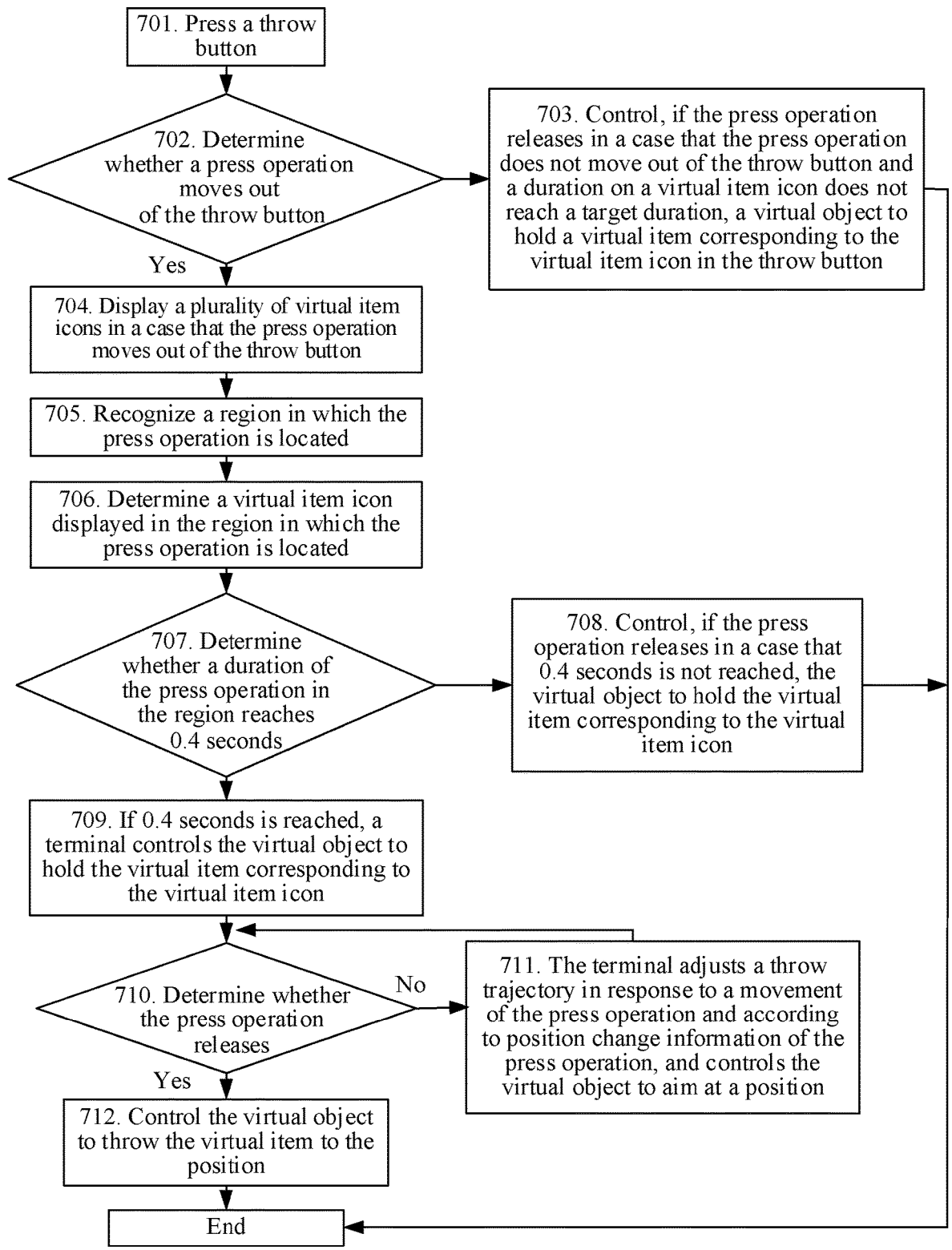
FIG. 7 is a flowchart of a virtual item control method according to an embodiment of this disclosure.

FIG. 7 is a flowchart of a virtual item control method according to an embodiment of this disclosure. Referring to FIG. 7, the method includes the following steps:

701. A user presses a throw button in a virtual scene interface, the throw button displaying an item icon.

702. A terminal determines whether the press operation moves out of the throw button, and performs the following step 703 or step 704.

703. If the press operation releases when the press operation does not move out of the throw button and a duration of the press operation on the item icon does not reach a target duration, the terminal controls a virtual object to hold a virtual item corresponding to the item icon in the throw button, and ends this process.

704. The terminal displays a plurality of item icons in response to the press operation moving out of the throw button.

705. The user continues to perform the press operation, and the terminal recognizes a region in which the press operation is currently located.

706. The terminal determines an item icon displayed in the region in which the press operation is located.

707. The terminal determines whether a duration of the press operation in the region reaches 0.4 seconds, and performs the following step 708 or step 709.

708. If the press operation releases when 0.4 seconds is not reached, the terminal controls the virtual object to hold the virtual item corresponding to the item icon, and ends this procedure.

709. If 0.4 seconds is reached, the terminal controls the virtual object to hold the virtual item corresponding to the item icon.

710. The terminal determines whether the press operation releases. If the press operation does not release, the terminal performs the following step 711; and if the press operation releases, the terminal performs the following step 712.

711. The terminal adjusts a throw trajectory in response to a movement of the press operation and according to position change information of the press operation, controls the virtual object to aim at a position, and continues to detect whether the press operation releases.

712. The terminal controls the virtual object to throw the virtual item to the position, and ends this throwing procedure.

Figure 8:
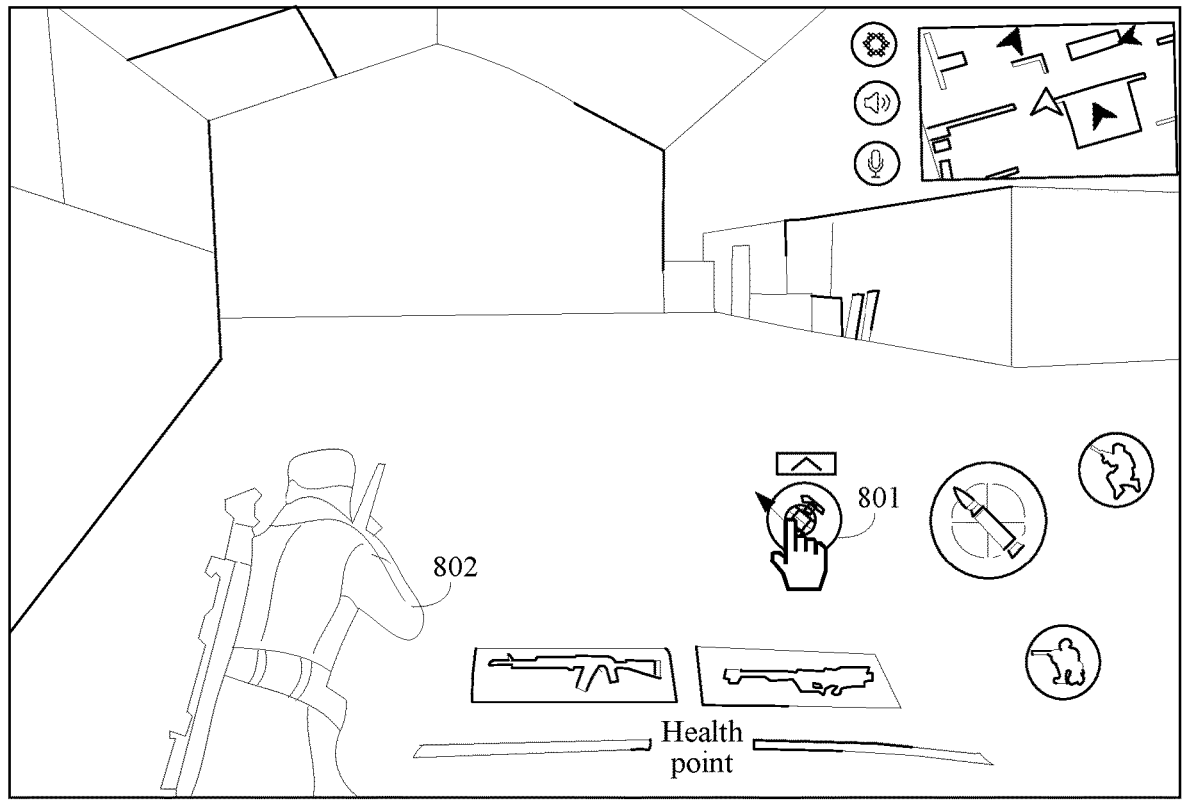
FIG. 8 is a schematic diagram of a virtual scene interface according to an embodiment of this disclosure.

For example, as shown in FIG. 8, the virtual scene interface includes a throw button 801 and a virtual object 802. When intending to select a virtual item to be thrown, the user performs a press operation on the throw button 801, and in response to the press operation moving out of the throw button 801, the terminal displays the virtual scene interface in FIG. 9.

Figure 9:
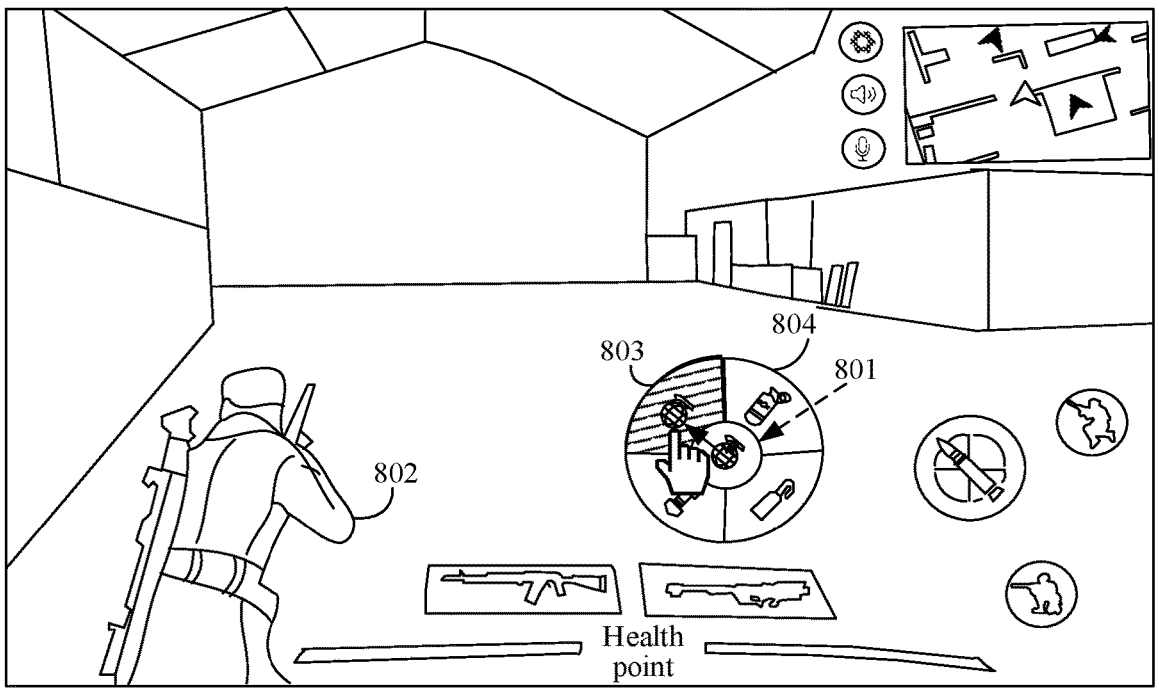
FIG. 9 is a schematic diagram of a virtual scene interface according to an embodiment of this disclosure.

As shown in FIG. 9, in the virtual scene interface, a plurality of item icons are displayed around the throw button 801, the plurality of item icons including a grenade icon 803 and a smoke grenade icon 804. When intending to select a grenade, the user continues to perform the press operation, and moves the press operation to the grenade icon 803. If detecting that the press operation moves to the grenade icon 803, the terminal switches a background color of a region in which the grenade icon 803 is displayed to black. If a duration of the press operation on the grenade icon 803 reaches 0.4 seconds, the terminal displays a virtual scene interface in FIG. 10. If a contact point also moves to the smoke grenade icon 804 when the duration of the press operation on the grenade icon 803 does not reach 0.4 seconds, and the press operation releases in response to a duration of the press operation on the smoke grenade icon 804 not reaching 0.4 seconds, the terminal displays a virtual scene interface in FIG. 11.

Figure 10:
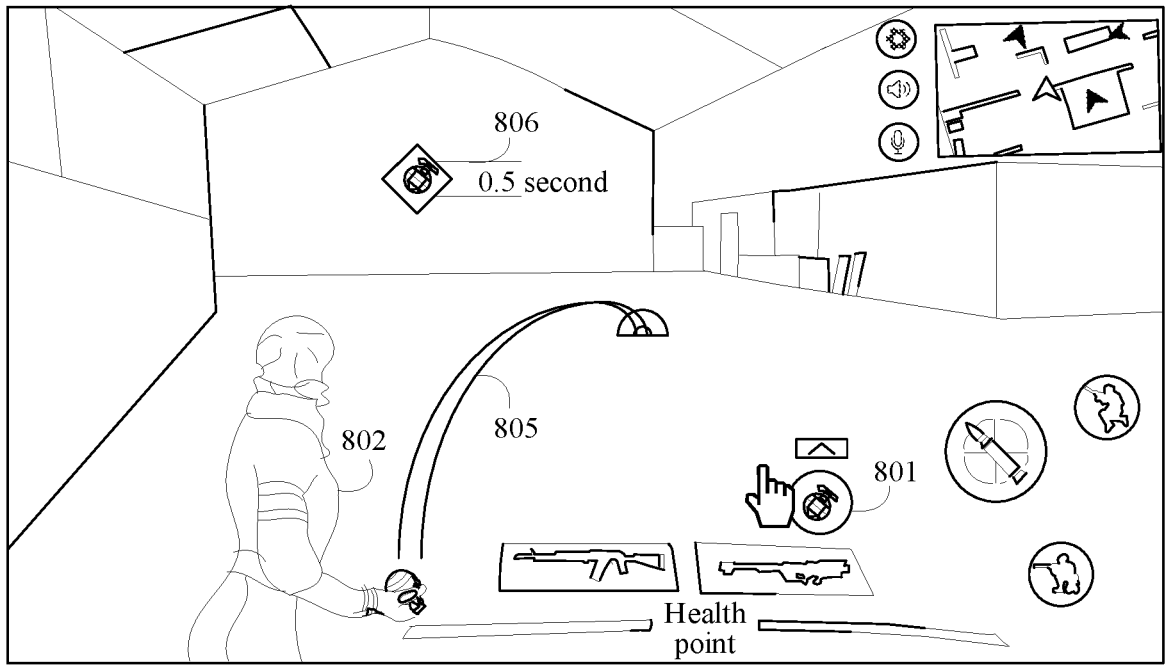
FIG. 10 is a schematic diagram of a virtual scene interface according to an embodiment of this disclosure.

As shown in FIG. 10, in the virtual scene interface, the terminal controls the virtual object 802 to hold a grenade, displays a throw trajectory 805 of the grenade, displays a function trigger countdown 806 of the grenade, cancels the display of a plurality of item icons, and switches the grenade icon displayed in the throw button 801 to the smoke grenade icon. In this case, the user still keeps the press operation and the grenade is in a ready-to-throw state. When adjusting the throw trajectory 805, aiming at a target position, and determining to throw the grenade, the user stops the press operation, and if detecting a release of the press operation, the terminal controls the virtual object 802 to throw the grenade to the target position.

Figure 11:
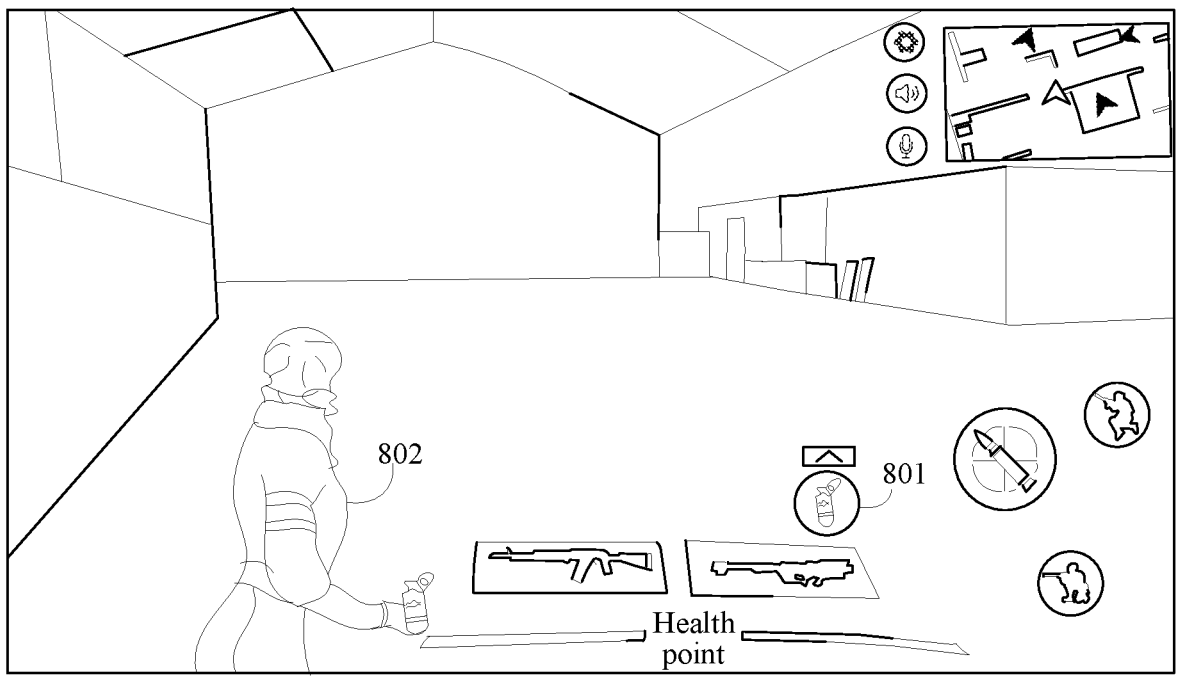
FIG. 11 is a schematic diagram of a virtual scene interface according to an embodiment of this disclosure.

As shown in FIG. 11, in the virtual scene interface, the terminal controls the virtual object 802 to hold a smoke grenade. However, the smoke grenade is not in a ready-to-throw state, and the virtual object 802 does not perform aiming, and cancels the display of the plurality of item icons.

Figure 12:
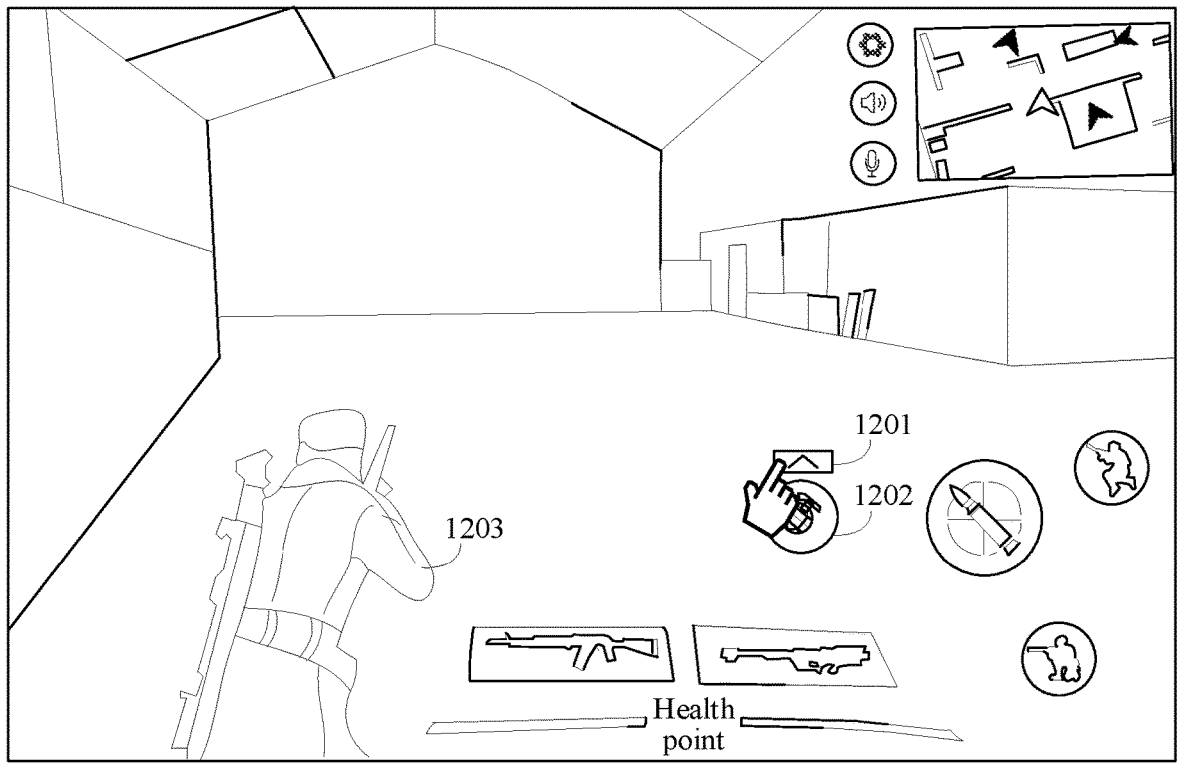
FIG. 12 is a schematic diagram of a virtual scene interface according to an embodiment of this disclosure.

As shown in FIG. 12, the virtual scene interface includes an item expansion button 1201, a throw button 1202, and a virtual object 1203. When intending to select a virtual item to be thrown, the user performs a click operation on the item expansion button 1201, and the terminal displays a virtual scene interface in FIG. 13.

Figure 13:
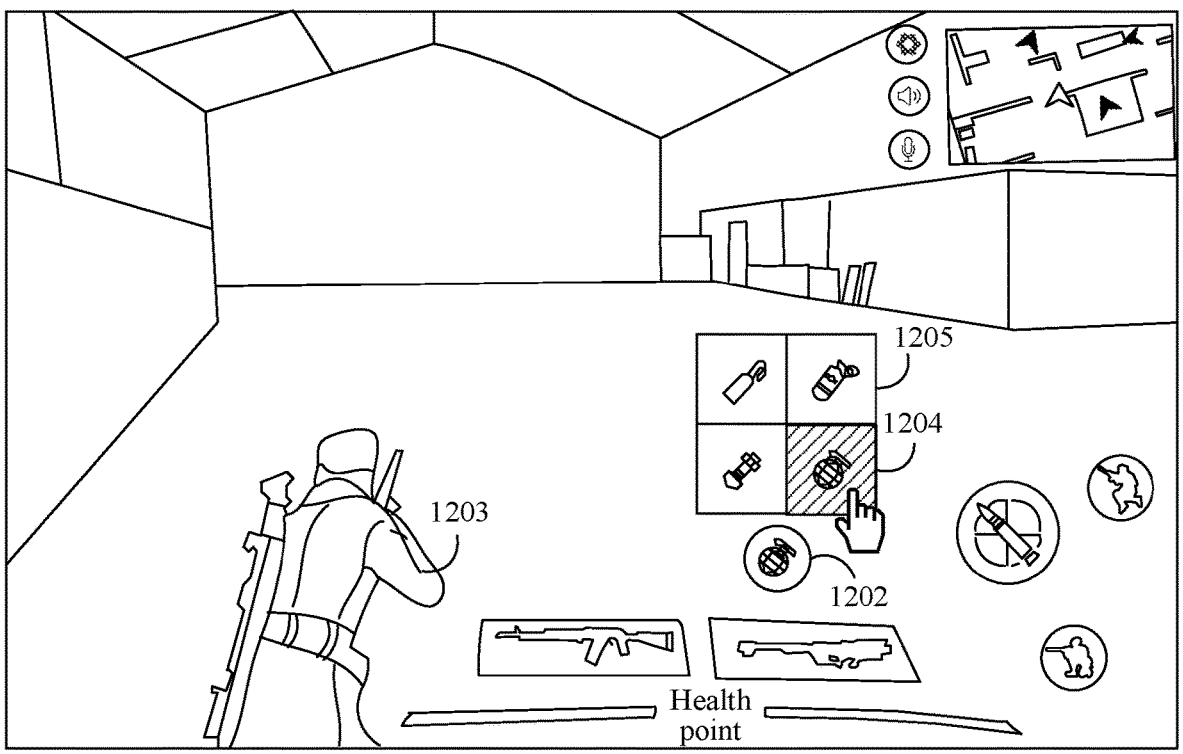
FIG. 13 is a schematic diagram of a virtual scene interface according to an embodiment of this disclosure.

As shown in FIG. 13, in the virtual scene interface, a plurality of item icons are displayed above the throw button 1202, and the plurality of item icons include a grenade icon 1204 and a smoke grenade icon 1205. When intending to select a grenade, the user performs a press operation on the grenade icon 1204. The terminal switches a background color of a region in which the grenade icon 1204 is displayed to black. If a duration of the press operation on the grenade icon 1204 reaches 0.4 seconds, the terminal displays an interface similar to the foregoing virtual scene interface in FIG. 10. If the press operation is pressed to the smoke grenade icon 1205 when the duration of the press operation on the grenade icon 1204 does not reach 0.4 seconds, and the press operation releases when a duration of a contact point on the smoke grenade icon 1205 does not reach 0.4 seconds, the terminal displays an interface similar to the foregoing virtual scene interface in FIG. 11.

Figure 14:
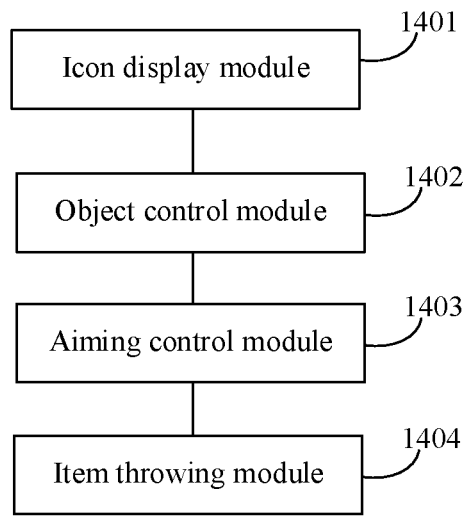
FIG. 14 is a schematic structural diagram of a virtual item control apparatus according to an embodiment of this disclosure.

FIG. 14 is a schematic structural diagram of a virtual item control apparatus according to an embodiment of this disclosure. Referring to FIG. 14, the apparatus includes:

an icon display module 1401, configured to display a plurality of item icons after a press operation on a throw button is detected, the plurality of item icons including a target item icon;

an object control module 1402, configured to control, in response to the press operation moving to the target item icon and a duration reaches a target duration, a virtual object to hold a target virtual item corresponding to the target item icon, the duration being a duration of the press operation on the target item icon;

an aiming control module 1403, configured to control, in response to a movement of the press operation, the virtual object to aim at a target position; and an item throwing module 1404, configured to control, in response to a release of the press operation, the virtual object to throw the target virtual item to the target position.

Figure 15:
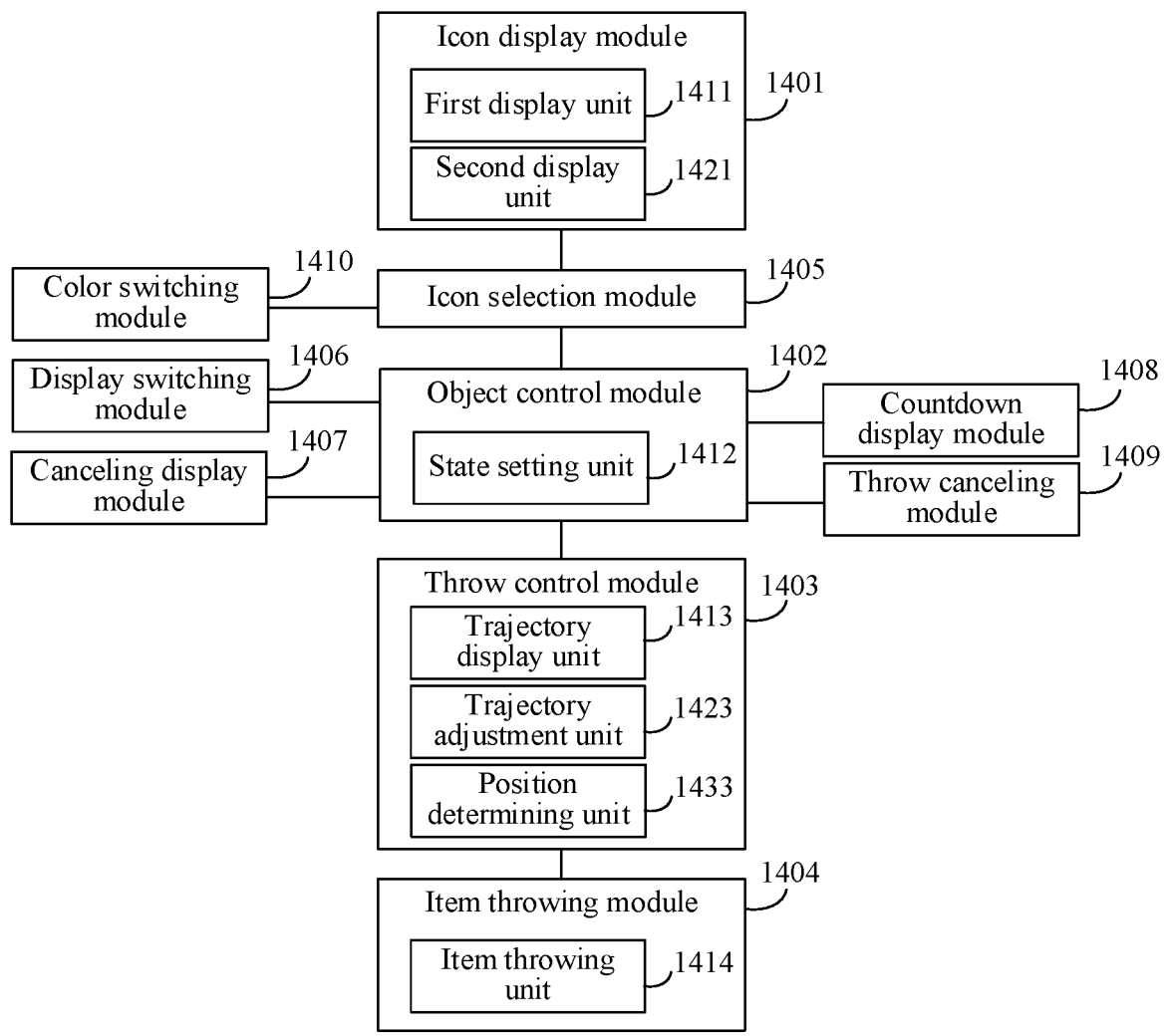
FIG. 15 is a schematic structural diagram of a virtual item control apparatus according to an embodiment of this disclosure.

Exemplarily, referring to FIG. 15, the apparatus further includes:

an icon selection module 1405, configured to set the target item icon to a selected state in response to the press operation moving to the target item icon.

Exemplarily, an object control module 1402 is configured to control, in response to a duration of the target item icon in the selected state reaching the target duration, the virtual object to hold the target virtual item.

Exemplarily, referring to FIG. 15, the icon display module 1401 includes:

a first display unit 1411, configured to display the plurality of item icons in a second region adjacent to a first region after the press operation on the throw button is detected, the first region being a region in which the throw button is located.

Exemplarily, referring to FIG. 15, the second region is an annular region, and the first region is located at a center of the annular region; alternatively, the second region is a rectangular region, and the first region is below the rectangular region.

Exemplarily, referring to FIG. 15, the icon display module 1401 includes:

a second display unit 1421, configured to display the plurality of item icons after the press operation on the throw button is detected and in response to the press operation moving out of the throw button.

Exemplarily, referring to FIG. 15, the apparatus further includes:

a display switching module 1406, configured to display the target item icon in the throw button in response to the duration reaching the target duration.

Exemplarily, referring to FIG. 15, the apparatus further includes:

a canceling display module 1407, configured to cancel the display of the plurality of item icons in response to the duration reaching the target duration.

Exemplarily, referring to FIG. 15, the apparatus further includes:

a countdown display module 1408, configured to display a function trigger countdown of the target virtual item in response to the duration reaches the target duration, the function trigger countdown referring to a duration between a current time point and a trigger time point of a function of the target virtual item.

Exemplarily, the aiming control module 1403 includes:

a trajectory display unit 1413, configured to display a throw trajectory of the target virtual item;

a trajectory adjustment unit 1423, configured to adjust the throw trajectory in response to the movement of the press operation and according to position change information of the press operation; and a position determining unit 1433, configured to determine a destination point of the throw trajectory as the target position.

Exemplarily, referring to FIG. 15, the object control module 1402 includes:

a state setting unit 1412, configured to control, in response to the press operation moving to the target item icon and the duration reaches the target duration, the virtual object to hold the target virtual item, and set the target virtual item to a ready-to-throw state; and the item throwing module 1404 includes:

an item throwing unit 1414, configured to control, when the target virtual item is in the ready-to-throw state and in response to the release of the press operation, the virtual object to throw the target virtual item to the target position.

Exemplarily, referring to FIG. 15, the apparatus further includes:

a throw canceling module 1409, configured to cancel the ready-to-throw state of the target virtual item in response to canceling the press operation on the throw button.

Exemplarily, referring to FIG. 15, the apparatus further includes:

a color switching module 1410, configured to switch, in response to the press operation moving to the target item icon, a background color of a region in which the target item icon is located to a prompt color.

When the virtual item control apparatus provided in the foregoing embodiments throws the virtual item, the division of the foregoing functional modules is merely an example for description. In actual application, the functions may be allocated to and completed by different functional modules according to requirements. That is, an internal structure of the terminal is divided into different functional modules, to implement all or some of the functions described above. In addition, the embodiments of the virtual item control apparatus provided in the foregoing embodiments and the virtual item control method belong to the same concept. For a specific implementation process, refer to the method embodiments, and details are not described herein again.

In the apparatus provided in the embodiments of this disclosure, the display, selection, and throwing of the virtual item can be completed only when a user is required to perform one continuous and coherent press operation, so that the operation is smoother, and a plurality of different operations do not need to be performed, thereby simplifying the operation procedure and improving the efficiency of throwing the virtual item.

Figure 16:
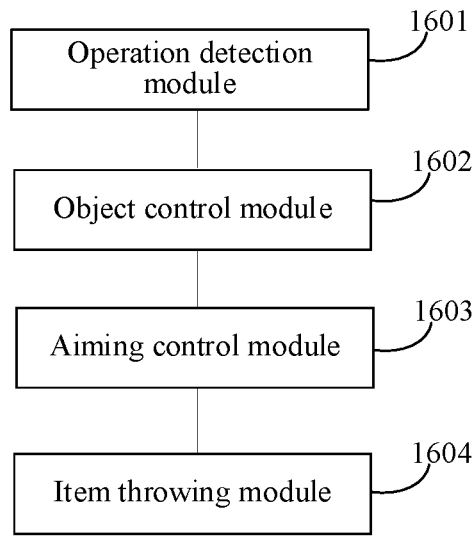
FIG. 16 is a schematic structural diagram of a virtual item control apparatus according to an embodiment of this disclosure.

FIG. 16 is a schematic structural diagram of a virtual item control apparatus according to an embodiment of this disclosure. Referring to FIG. 16, the apparatus includes:

an operation detection module 1601, configured to display a target item icon in a throw button;

an object control module 1602, configured to control, in response to a duration of a press operation on the target item icon reaching a target duration, a virtual object to hold a target virtual item corresponding to the target item icon;

an aiming control module 1603, configured to control, in response to a movement of the press operation, the virtual object to aim at a target position; and an item throwing module 1604, configured to control, in response to a release of the press operation, the virtual object to throw the target virtual item to the target position.

Exemplarily, the operation detection module 1601 is further configured to detect the press operation on the throw button in response to the target item icon being displayed in the throw button.

Figure 17:
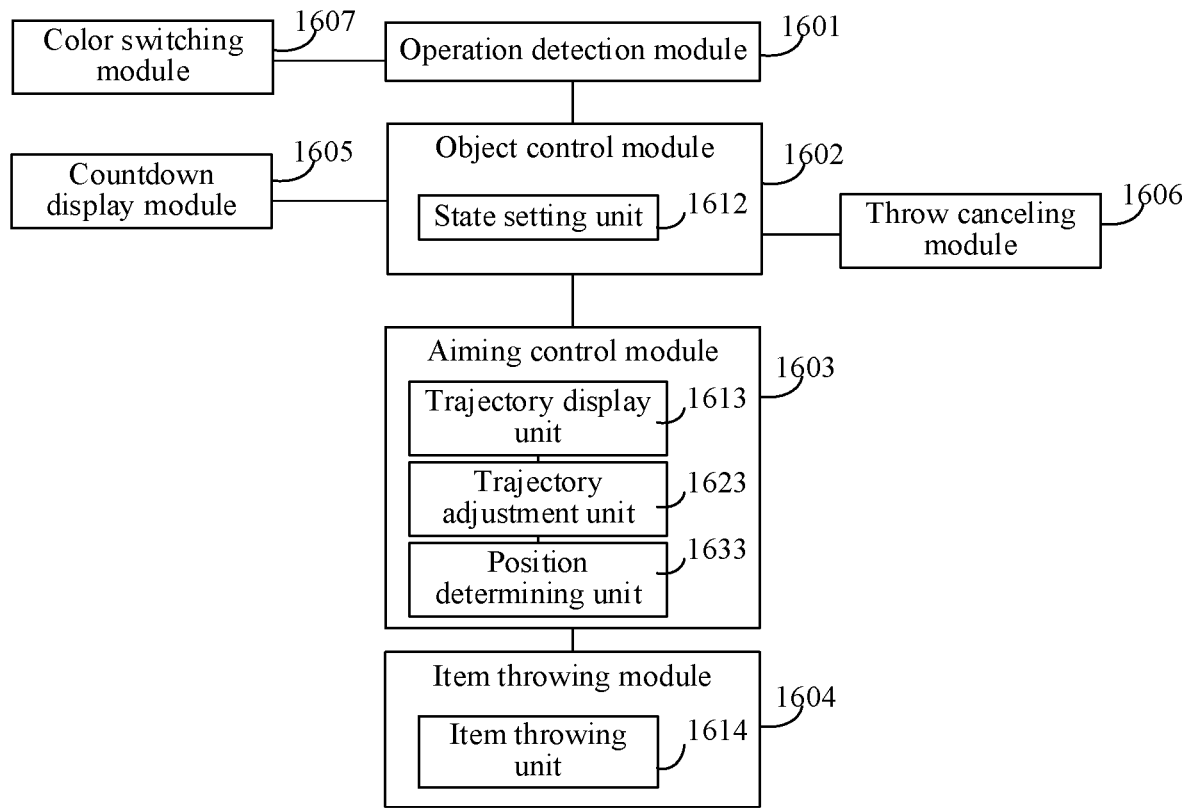
FIG. 17 is a schematic structural diagram of a virtual item control apparatus according to an embodiment of this disclosure.

Exemplarily, referring to FIG. 17, the apparatus further includes:

a countdown display module 1605, configured to display a function trigger countdown of the target virtual item in response to the duration reaching the target duration, the function trigger countdown referring to a duration between a current time point and a trigger time point of a function of the target virtual item.

Exemplarily, referring to FIG. 17, the aiming control module 1603 includes:

a trajectory display unit 1613, configured to display a throw trajectory of the target virtual item;

a trajectory adjustment unit 1623, configured to adjust the throw trajectory in response to the movement of the press operation and according to position change information of the press operation; and a position determining unit 1633, configured to determine a destination point of the throw trajectory as the target position.

Exemplarily, referring to FIG. 17, the object control module 1602 includes:

a state setting unit 1612, configured to control, in response to the duration reaching the target duration, the virtual object to hold the target virtual item, and set the target virtual item to a ready-to-throw state; and the item throwing module 1604 includes:

an item throwing unit 1614, configured to control, when the target virtual item is in the ready-to-throw state and in response to the release of the press operation, the virtual object to throw the target virtual item to the target position.

Exemplarily, referring to FIG. 17, the apparatus further includes:

a throw canceling module 1606, configured to cancel the ready-to-throw state of the target virtual item in response to canceling the press operation on the throw button.

Exemplarily, referring to FIG. 17, the apparatus further includes:

a color switching module 1607, configured to switch a background color of a region in which the throw button is located to a prompt color.

When the virtual item control apparatus provided in the foregoing embodiments throws the virtual item, the division of the foregoing functional modules is merely an example for description. In actual application, the functions may be allocated to and completed by different functional modules according to requirements. That is, an internal structure of the terminal is divided into different functional modules, to implement all or some of the functions described above. In addition, the embodiments of the virtual item control apparatus provided in the foregoing embodiments and the virtual item control method belong to the same concept. For a specific implementation process, refer to the method embodiments, and details are not described herein again.

In the apparatus provided in the embodiments of this disclosure, when the target item icon is displayed in the throw button, the selection and throwing of the target virtual item can be completed by directly performing the press operation on the throw button, and there is no need to first press the throw button to display the item icons, and then select the virtual item to perform throwing, thereby simplifying the operation procedure, saving the operation time, and improving the efficiency of throwing the virtual item.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 18:
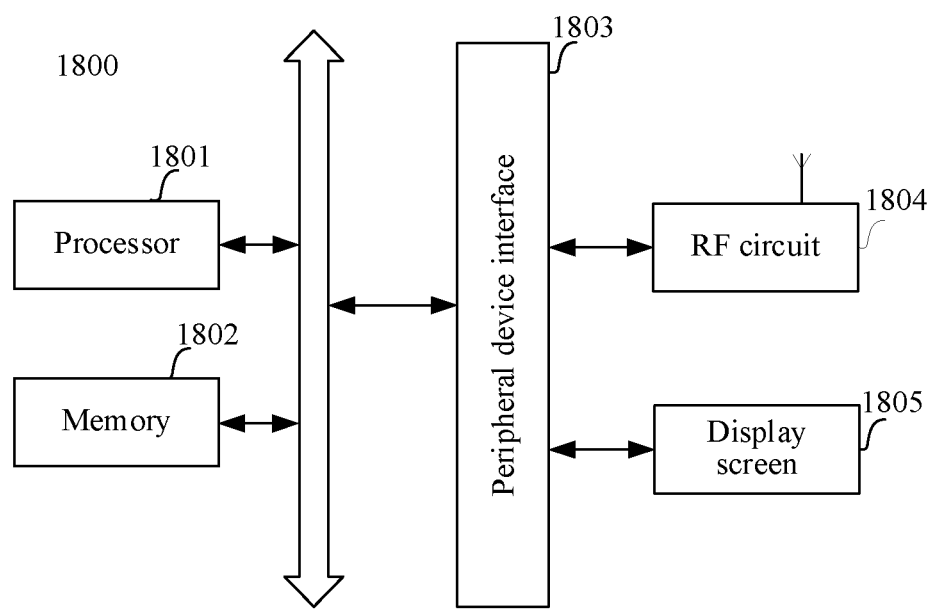
FIG. 18 is a schematic structural diagram of a terminal according to an embodiment of this disclosure.

FIG. 18 is a schematic structural diagram of a terminal 1800 according to an exemplary embodiment of this disclosure. The terminal 1800 may be configured to perform steps performed by the terminal in the foregoing virtual item control method.

The terminal 1800 includes a processor 1801 and a memory 1802.

The processor 1801 may include one or more processing cores, for example, a 4-core processor or an 8-core processor. The processor 1801 may be implemented by using at least one hardware form of a digital signal processor (DSP), a field-programmable gate array (FPGA), and a programmable logic array (PLA). The processor 1801 may alternatively include a main processor and a coprocessor. The main processor is a processor configured to process data in an awake state, and is also referred to as a central processing unit (CPU). The coprocessor is a low power consumption processor configured to process the data in a standby state. In some embodiments, the processor 1801 may be integrated with a graphics processing unit (GPU). The GPU is configured to render and draw content that needs to be displayed on a display screen. In some embodiments, the processor 1801 may further include an AI processor. The AI processor is configured to process computing operations related to machine learning.

The memory 1802 may include one or more computer-readable storage media. The computer-readable storage media may be non-transient. The memory 1802 may further include a high-speed random access memory (RAM) and a non-volatile memory, for example, one or more disk storage devices or flash memory devices. In some embodiments, a non-transient computer-readable storage medium in the memory 1802 is configured to store at least one piece of program code, the at least one piece of program code being configured to be executed by the processor 1801 to implement the virtual item control method provided in the method embodiments of this disclosure.

In some embodiments, the terminal 1800 may exemplarily include a peripheral device interface 1803 and at least one peripheral device. The processor 1801, the memory 1802, and the peripheral device interface 1803 may be connected through a bus or a signal line. Each peripheral device may be connected to the peripheral device interface 1803 through a bus, a signal cable, or a circuit board. Specifically, the peripheral device includes at least one of a radio frequency (RF) circuit 1804 and a display screen 1805.

The peripheral device interface 1803 may be configured to connect the at least one peripheral device related to input/output (I/O) to the processor 1801 and the memory 1802. In some embodiments, the processor 1801, the memory 1802, and the peripheral device interface 1803 are integrated on the same chip or circuit board. In some other embodiments, any one or two of the processor 1801, the memory 1802, and the peripheral device interface 1803 may be implemented on a separate chip or circuit board. This is not limited in this embodiment.

The RF circuit 1804 is configured to receive and transmit a RF signal, also referred to as an electromagnetic signal. The RF circuit 1804 communicates with a communication network and other communication devices through the electromagnetic signal. The RF circuit 1804 may convert an electric signal into an electromagnetic signal for transmission, or convert a received electromagnetic signal into an electric signal. Exemplarily, the RF circuit 1804 includes: an antenna system, an RF transceiver, one or more amplifiers, a tuner, an oscillator, a digital signal processor, a codec chip set, a subscriber identity module card, and the like. The RF circuit 1804 may communicate with other devices through at least one wireless communication protocol. The wireless communications protocol includes, but not limited to, a metropolitan area network, different generations of mobile communication networks (2G, 3G, 4G, and 5G), a wireless local area network, and/or a wireless fidelity (Wi-Fi) network. In some embodiments, the RF circuit 1804 may further include a circuit related to near field communication (NFC), which is not limited in this disclosure.

The display screen 1805 is configured to display a user interface (UI). The UI may include a graphic, a text, an icon, a video, and any combination thereof. When the display screen 1805 is a touchscreen, the display screen 1805 is further capable of acquiring a touch signal on or above a surface of the display screen 1805. The touch signal may be inputted into the processor 1801 as a control signal for processing. In this case, the display screen 1805 may be further configured to provide a virtual button and/or a virtual keyboard, also referred to as a soft button and/or a soft keyboard. In some embodiments, there may be one display screen 1805 disposed on a front panel of the terminal 1800. In some other embodiments, there may be at least two display screens 1805 respectively disposed on different surfaces of the terminal 1800 or designed in a foldable shape. In some other embodiments, the display screen 1805 may be a flexible display screen disposed on a curved surface or a folded surface of the terminal 1800. Even, the display screen 1805 may be further set in a non-rectangular irregular pattern, namely, a special-shaped screen. The display screen 1805 may be manufactured by using a material such as a liquid crystal display (LCD), an organic light-emitting diode (OLED), or the like.

A person skilled in the art may understand that the structure shown in FIG. 18 does not constitute a limitation on the terminal 1800, and the terminal may include more components or fewer components than those shown in the figure, or some components may be combined, or a different component deployment may be used.

An embodiment of this disclosure further provides a terminal configured to throw a virtual item. The terminal includes a processor and a memory, the memory storing at least one piece of program code, the at least one piece of program code being loaded and executed by the processor to implement the following operations:

displaying a plurality of item icons after a press operation on a throw button is detected, the plurality of item icons including a target item icon;

controlling, in response to the press operation moving to the target item icon and a duration reaches a target duration, a virtual object to hold a target virtual item corresponding to the target item icon, the duration being a duration of the press operation on the target item icon;

controlling, in response to a movement of the press operation, the virtual object to aim at a target position; and controlling, in response to a release of the press operation, the virtual object to throw the target virtual item to the target position.

Exemplarily, the at least one piece of program code is loaded and executed by the processor to implement the following operations:

setting the target item icon to a selected state in response to the press operation moving to the target item icon.

Exemplarily, the at least one piece of program code is loaded and executed by the processor to implement the following operations:

controlling, in response to a duration of the target item icon in the selected state reaching the target duration, the virtual object to hold the target virtual item.

Exemplarily, the at least one piece of program code is loaded and executed by the processor to implement the following operations:

displaying the plurality of item icons in a second region adjacent to a first region after the press operation on the throw button is detected, the first region being a region in which the throw button is located.

Exemplarily, the second region is an annular region, and the first region is located at a center of the annular region; alternatively, the second region is a rectangular region, and the first region is below the rectangular region.

Exemplarily, the at least one piece of program code is loaded and executed by the processor to implement the following operations:

displaying the plurality of item icons after the press operation on the throw button is detected and in response to the press operation moving out of the throw button.

Exemplarily, the at least one piece of program code is loaded and executed by the processor to implement the following operations:

displaying the target item icon in the throw button in response to the duration reaching the target duration.

Exemplarily, the at least one piece of program code is loaded and executed by the processor to implement the following operations:

canceling the display of the plurality of item icons in response to the duration reaching the target duration.

Exemplarily, the at least one piece of program code is loaded and executed by the processor to implement the following operations:

displaying a function trigger countdown of the target virtual item in response to the duration reaches the target duration, the function trigger countdown referring to a duration between a current time point and a trigger time point of a function of the target virtual item.

Exemplarily, the at least one piece of program code is loaded and executed by the processor to implement the following operations:

displaying a throw trajectory of the target virtual item;

adjusting the throw trajectory in response to the movement of the press operation and according to position change information of the press operation; and determining a destination point of the throw trajectory as the target position.

Exemplarily, the at least one piece of program code is loaded and executed by the processor to implement the following operations:

controlling, in response to the press operation moving to the target item icon and the duration reaches the target duration, the virtual object to hold the target virtual item, and setting the target virtual item to a ready-to-throw state; and controlling, when the target virtual item is in the ready-to-throw state and in response to the release of the press operation, the virtual object to throw the target virtual item to the target position.

Exemplarily, the at least one piece of program code is loaded and executed by the processor to implement the following operations:

canceling the ready-to-throw state of the target virtual item in response to canceling the press operation on the throw button.

Exemplarily, the at least one piece of program code is loaded and executed by the processor to implement the following operations:

switching, in response to the press operation moving to the target item icon, a background color of a region in which the target item icon is located to a prompt color.

An embodiment of this disclosure further provides another terminal configured to throw a virtual item. The terminal includes a processor and a memory, the memory storing at least one piece of program code, the at least one piece of program code being loaded and executed by the processor to implement the following operations:

displaying a target item icon in a throw button;

controlling, in response to a duration of a press operation on the target item icon reaching a target duration, a virtual object to hold a target virtual item corresponding to the target item icon;

controlling, in response to a movement of the press operation, the virtual object to aim at a target position; and controlling, in response to a release of the press operation, the virtual object to throw the target virtual item to the target position.

Exemplarily, the at least one piece of program code is loaded and executed by the processor to implement the following operations:

detecting the press operation on the throw button in response to the target item icon being displayed in the throw button.

Exemplarily, the at least one piece of program code is loaded and executed by the processor to implement the following operations:

displaying a function trigger countdown of the target virtual item in response to the duration reaching the target duration, the function trigger countdown referring to a duration between a current time point and a trigger time point of a function of the target virtual item.

Exemplarily, the at least one piece of program code is loaded and executed by the processor to implement the following operations:

displaying a throw trajectory of the target virtual item;

adjusting the throw trajectory in response to the movement of the press operation and according to position change information of the press operation; and determining a destination point of the throw trajectory as the target position.

Exemplarily, the at least one piece of program code is loaded and executed by the processor to implement the following operations:

controlling, in response to the duration reaching the target duration, the virtual object to hold the target virtual item, and setting the target virtual item to a ready-to-throw state; and the controlling, in response to a release of the press operation, the virtual object to throw the target virtual item to the target position includes:

controlling, when the target virtual item is in the ready-to-throw state and in response to the release of the press operation, the virtual object to throw the target virtual item to the target position.

Exemplarily, the at least one piece of program code is loaded and executed by the processor to implement the following operations:

canceling the ready-to-throw state of the target virtual item in response to canceling the press operation on the throw button.

Exemplarily, the at least one piece of program code is loaded and executed by the processor to implement the following operations:

switching a background color of a region in which the throw button is located to a prompt color.

An embodiment of this disclosure further provides a computer-readable storage medium, the computer-readable storage medium storing at least one piece of program code, the at least one piece of program code being loaded and executed by a processor to implement the following operations:

displaying a plurality of item icons after a press operation on a throw button is detected, the plurality of item icons including a target item icon;

controlling, in response to the press operation moving to the target item icon and a duration reaches a target duration, a virtual object to hold a target virtual item corresponding to the target item icon, the duration being a duration of the press operation on the target item icon;

controlling, in response to a movement of the press operation, the virtual object to aim at a target position; and controlling, in response to a release of the press operation, the virtual object to throw the target virtual item to the target position.

Exemplarily, the at least one piece of program code is loaded and executed by the processor to implement the following operations:

setting the target item icon to a selected state in response to the press operation moves to the target item icon.

Exemplarily, the at least one piece of program code is loaded and executed by the processor to implement the following operations:

controlling, in response to a duration of the target item icon in the selected state reaching the target duration, the virtual object to hold the target virtual item.

Exemplarily, the at least one piece of program code is loaded and executed by the processor to implement the following operations:

displaying the plurality of item icons in a second region adjacent to a first region after the press operation on the throw button is detected, the first region being a region in which the throw button is located.

Exemplarily, the second region is an annular region, and the first region is located at a center of the annular region; alternatively, the second region is a rectangular region, and the first region is below the rectangular region.

Exemplarily, the at least one piece of program code is loaded and executed by the processor to implement the following operations:

displaying the plurality of item icons after the press operation on the throw button is detected and in response to the press operation moving out of the throw button.

Exemplarily, the at least one piece of program code is loaded and executed by the processor to implement the following operations:

displaying the target item icon in the throw button in response to the duration reaches the target duration.

Exemplarily, the at least one piece of program code is loaded and executed by the processor to implement the following operations:

canceling the display of the plurality of item icons in response to the duration reaches the target duration.

Exemplarily, the at least one piece of program code is loaded and executed by the processor to implement the following operations:

displaying a function trigger countdown of the target virtual item in response to the duration reaches the target duration, the function trigger countdown referring to a duration between a current time point and a trigger time point of a function of the target virtual item.

Exemplarily, the at least one piece of program code is loaded and executed by the processor to implement the following operations:

displaying a throw trajectory of the target virtual item;

adjusting the throw trajectory in response to the movement of the press operation and according to position change information of the press operation; and determining a destination point of the throw trajectory as the target position.

Exemplarily, the at least one piece of program code is loaded and executed by the processor to implement the following operations:

controlling, in response to the press operation moving to the target item icon and the duration reaches the target duration, the virtual object to hold the target virtual item, and setting the target virtual item to a ready-to-throw state; and controlling, when the target virtual item being in the ready-to-throw state and in response to the release of the press operation, the virtual object to throw the target virtual item to the target position.

Exemplarily, the at least one piece of program code is loaded and executed by the processor to implement the following operations:

canceling the ready-to-throw state of the target virtual item in response to canceling the press operation on the throw button.

Exemplarily, the at least one piece of program code is loaded and executed by the processor to implement the following operations:

switching, in response to the press operation moving to the target item icon, a background color of a region in which the target item icon is located to a prompt color.

An embodiment of this disclosure further provides another computer-readable storage medium, the computer-readable storage medium storing at least one piece of program code, the at least one piece of program code being loaded and executed by a processor to implement the following operations:

displaying a target item icon in a throw button;

controlling, in response to a duration of a press operation on the target item icon reaching a target duration, a virtual object to hold a target virtual item corresponding to the target item icon;

controlling, in response to a movement of the press operation, the virtual object to aim at a target position; and controlling, in response to a release of the press operation, the virtual object to throw the target virtual item to the target position.

Exemplarily, the at least one piece of program code is loaded and executed by the processor to implement the following operations:

detecting the press operation on the throw button in response to the target item icon being displayed in the throw button.

Exemplarily, the at least one piece of program code is loaded and executed by the processor to implement the following operations:

displaying a function trigger countdown of the target virtual item in response to the duration reaching the target duration, the function trigger countdown referring to a duration between a current time point and a trigger time point of a function of the target virtual item.

Exemplarily, the at least one piece of program code is loaded and executed by the processor to implement the following operations:

displaying a throw trajectory of the target virtual item;

adjusting the throw trajectory in response to the movement of the press operation and according to position change information of the press operation; and determining a destination point of the throw trajectory as the target position.

Exemplarily, the at least one piece of program code is loaded and executed by the processor to implement the following operations:

controlling, in response to the duration reaching the target duration, the virtual object to hold the target virtual item, and setting the target virtual item to a ready-to-throw state; and the controlling, in response to a release of the press operation, the virtual object to throw the target virtual item to the target position includes:

controlling, when the target virtual item is in the ready-to-throw state and in response to the release of the press operation, the virtual object to throw the target virtual item to the target position.

Exemplarily, the at least one piece of program code is loaded and executed by the processor to implement the following operations:

canceling the ready-to-throw state of the target virtual item in response to canceling the press operation on the throw button.

Exemplarily, the at least one piece of program code is loaded and executed by the processor to implement the following operations:

switching a background color of a region in which the throw button is located to a prompt color.

An embodiment of this disclosure further provides a computer program product or a computer program, the computer program product or the computer program including computer program code, the computer program code being stored in a computer-readable storage medium, a processor of a terminal reading the computer program code from the computer-readable storage medium, and the processor executing the computer program code to cause the terminal to implement the virtual item control method according to the foregoing embodiments.

A person of ordinary skill in the art may understand that all or some of the steps of the foregoing embodiments may be implemented by hardware, or may be implemented a program instructing related hardware. The program may be stored in a computer-readable storage medium. The storage medium may be a ROM, a magnetic disk, or an optical disc, or the like.

The foregoing descriptions are merely exemplarily embodiments of the embodiments of this disclosure, but are not intended to limit the embodiments of this disclosure. Any modification, equivalent replacement, or improvement made within the spirit and principle of the embodiments of this disclosure falls within the protection scope of this disclosure.

What is claimed is:

1. A virtual item control method, performed by a terminal, the method comprising:
   displaying a plurality of item icons after a press operation on a throw button is detected, the plurality of item icons comprising a target item icon;
   controlling, in response to the press operation moving to the target item icon and a duration reaches a target duration, a virtual object to hold a target virtual item corresponding to the target item icon, the duration being defined by the period of the press operation on the target item icon;
   controlling, in response to a movement of the press operation, the virtual object to aim at a target position; and
   controlling, in response to a release of the press operation, the virtual object to release the target virtual item toward the target position.

2. The method according to claim 1, further comprising:
   setting the target item icon to a selected state in response to the press operation moving to the target item icon.

3. The method according to claim 2, wherein controlling, in response to the press operation moving to the target item icon and the duration reaches the target duration, the virtual object to hold the target virtual item comprises:
   controlling, in response to a duration of the target item icon in the selected state reaching the target duration, the virtual object to hold the target virtual item.

4. The method according to claim 1, wherein after displaying the plurality of item icons after the press operation on the throw button is detected, the method comprises:
   displaying the plurality of item icons in a second region adjacent to a first region after the press operation on the throw button is detected, wherein the throw button is located in the first region.

5. The method according to claim 4, wherein the second region is annular, and the first region is located at a center of the second region; or
   the second region is rectangular, and the first region is below the second region.

6. The method according to claim 1, wherein after displaying the plurality of item icons after the press operation on the throw button is detected, the method comprises:
displaying the plurality of item icons in response to the press operation on the throw button being detected and the press operation moving out of the throw button.

7. The method according to claim 1, further comprising:
displaying the target item icon in the throw button in response to the duration reaching the target duration.

8. The method according to claim 1, further comprising:
hiding the plurality of item icons in response to the duration reaching the target duration.

9. The method according to claim 1, further comprising:
displaying a function trigger countdown of the target virtual item in response to the duration reaching the target duration, the function trigger countdown referring to a duration between a current time point and a trigger time point of a function of the target virtual item.

10. The method according to claim 1, wherein controlling, in response to the movement of the press operation, the virtual object to aim at the target position comprises:
displaying a throw trajectory of the target virtual item;
adjusting the throw trajectory in response to the movement of the press operation and according to position change information of the press operation; and
determining a destination point of the throw trajectory as the target position.

11. The method according to claim 1, wherein controlling, in response to the press operation moving to the target item icon and the duration reaches the target duration, the virtual object to hold a target virtual item corresponding to the target item icon comprises:
setting the target virtual item to a ready-to-throw state; and
wherein controlling, in response to the release of the press operation, the virtual object to release the target virtual item to the target position comprises:
controlling, when the target virtual item is in the ready-to-throw state and in response to the release of the press operation, the virtual object to throw the target virtual item to the target position.

12. The method according to claim 11, further comprising:
canceling the ready-to-throw state of the target virtual item in response to canceling the press operation on the throw button.

13. The method according to claim 1, further comprising:
switching, in response to the press operation moving to the target item icon, a background color of a region in which the target item icon is located to a prompt color.

* * * * *